April 20, 1943.      W. D. FOSTER ET AL      2,316,780
FILM HANDLING APPARATUS
Original Filed April 21, 1933      8 Sheets-Sheet 1
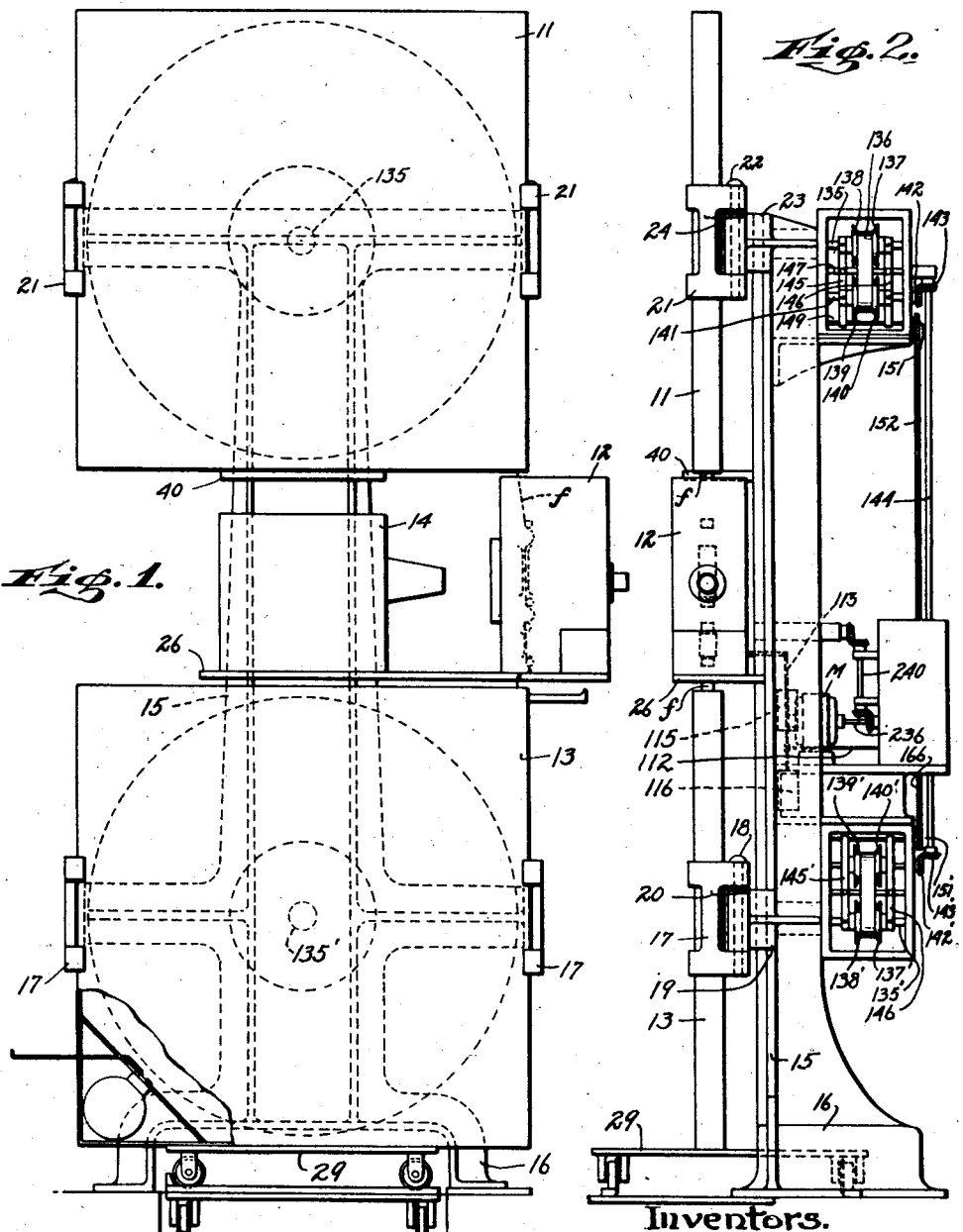
Inventors.
Warren Dunham Foster
Frederick Davenport Sweet, Dec'd,
by Gertrude Sweet, Administratrix
By Warren Dunham Foster
Attorney.

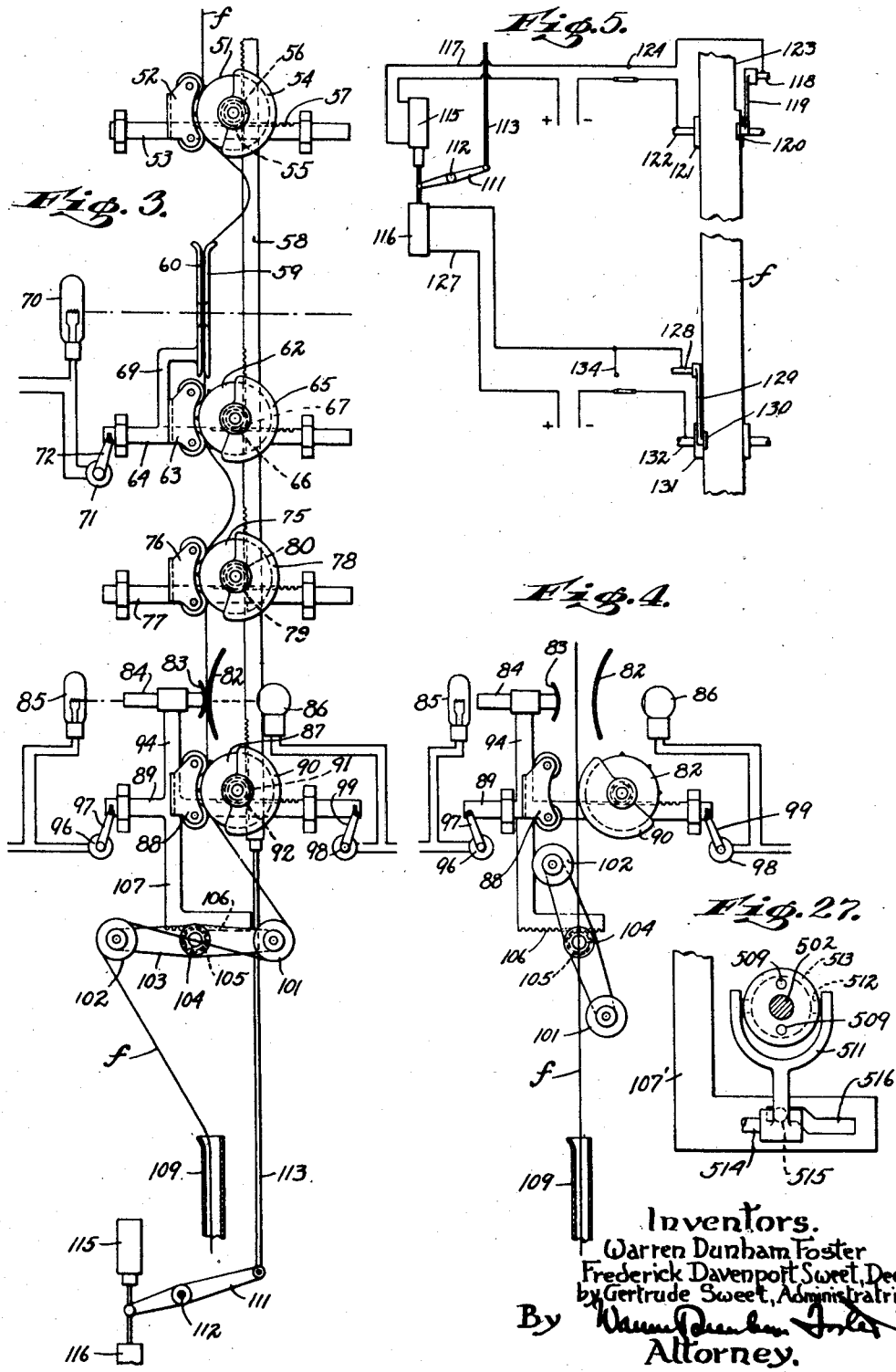

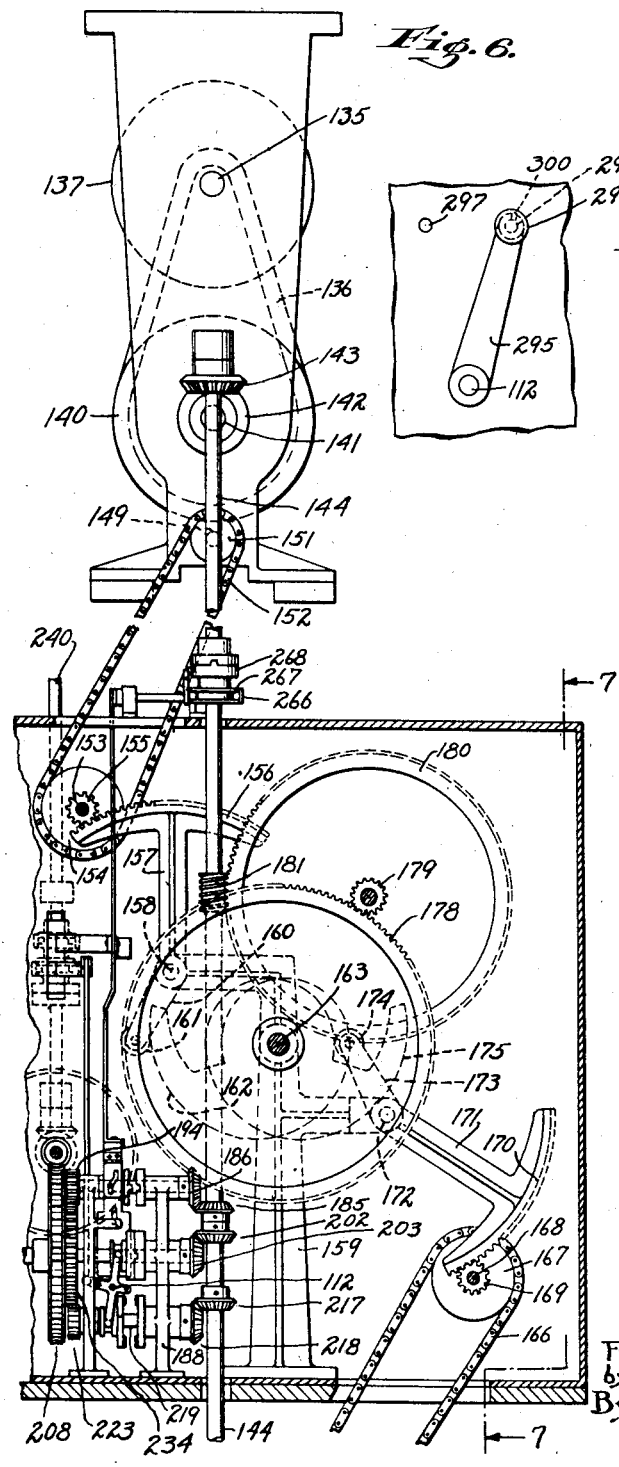

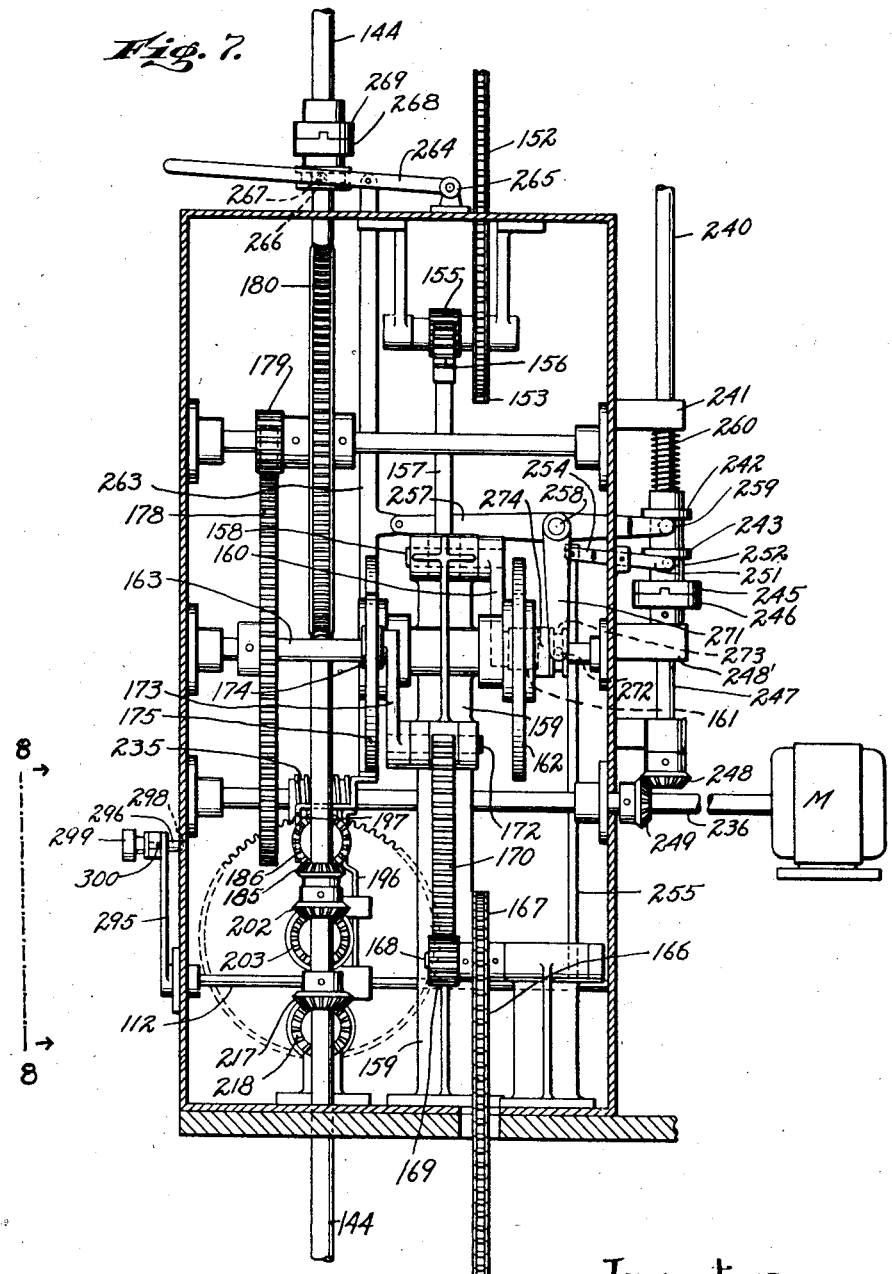

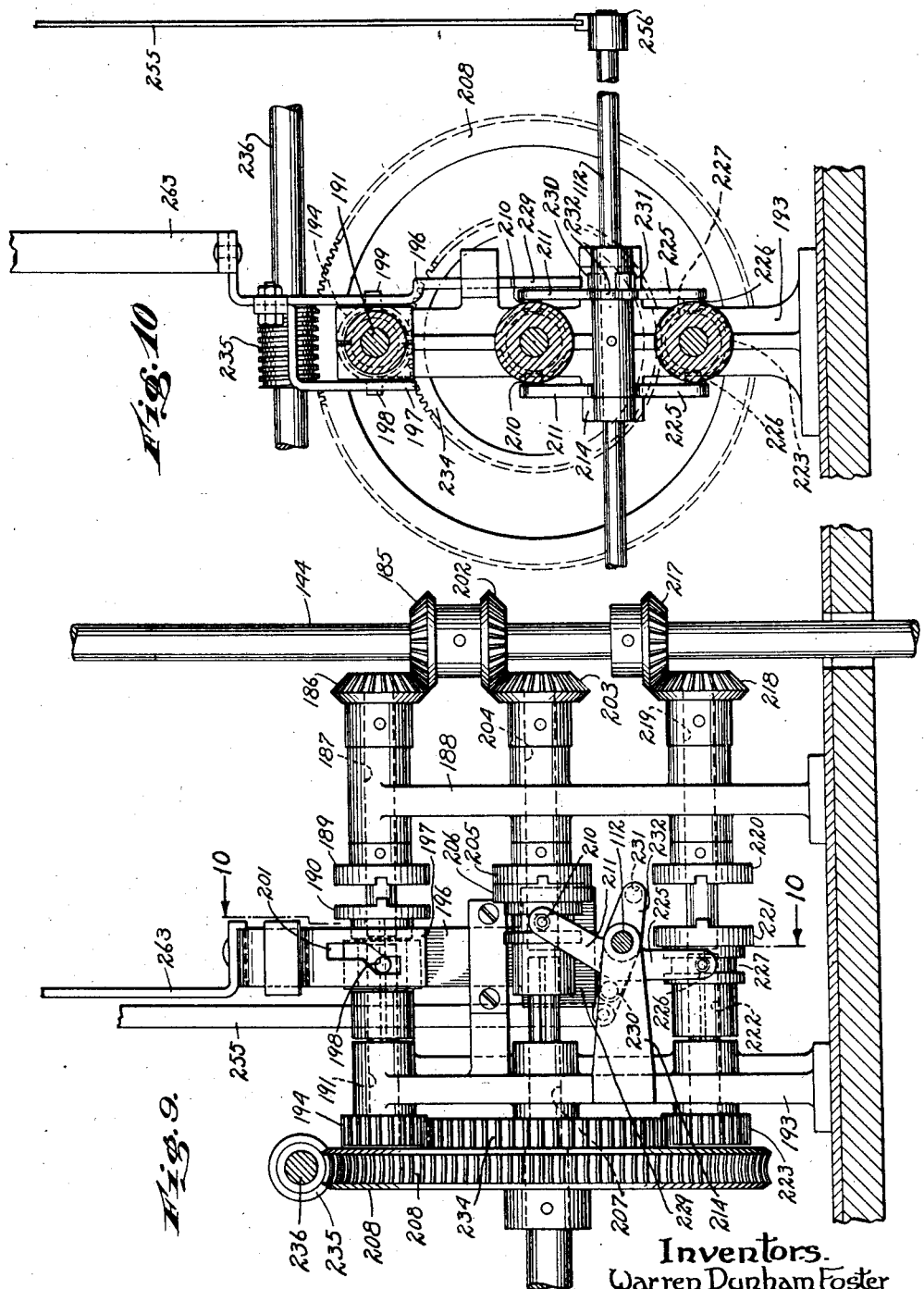

April 20, 1943.  W. D. FOSTER ET AL  2,316,780
FILM HANDLING APPARATUS
Original Filed April 21, 1933  8 Sheets-Sheet 6
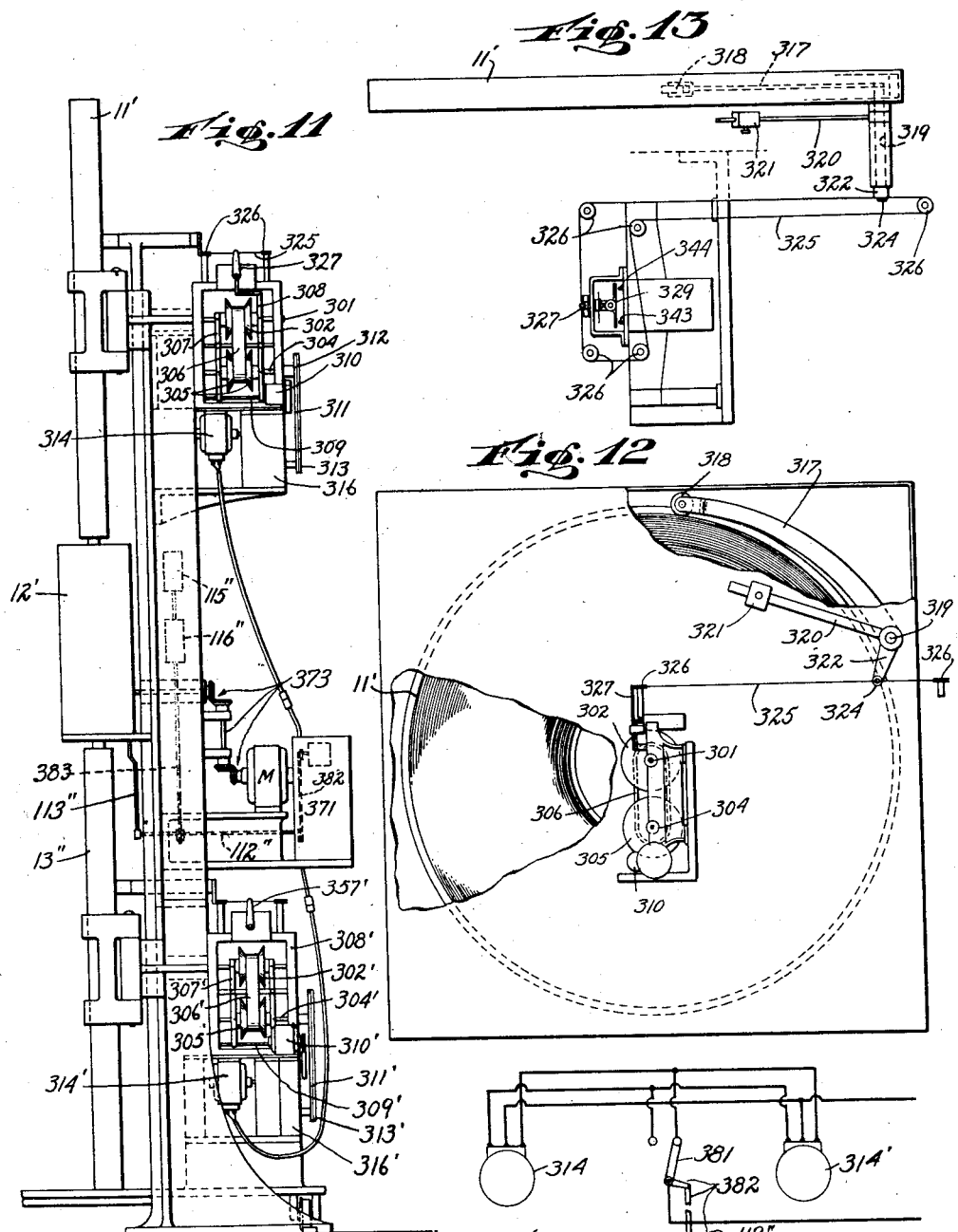

April 20, 1943.  W. D. FOSTER ET AL  2,316,780
FILM HANDLING APPARATUS
Original Filed April 21, 1933   8 Sheets-Sheet 7
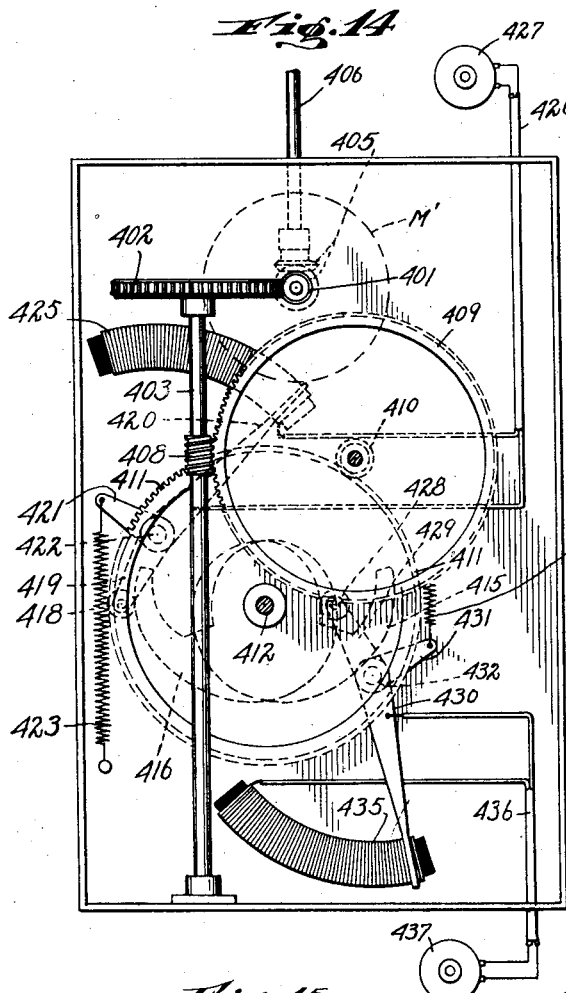
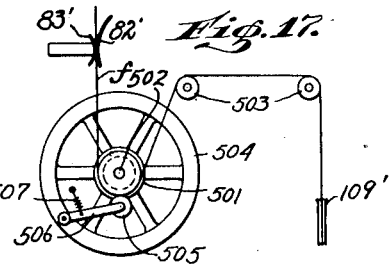
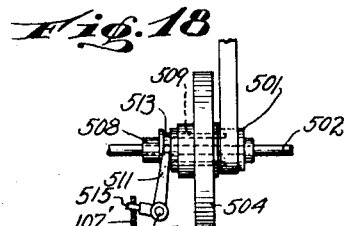
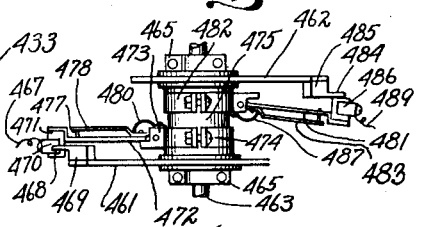
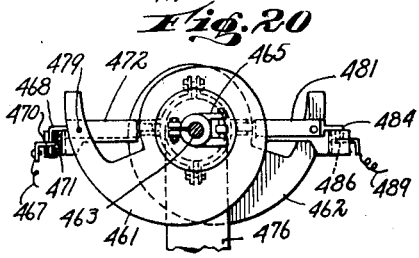
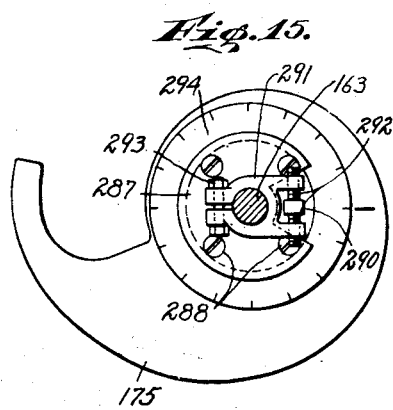
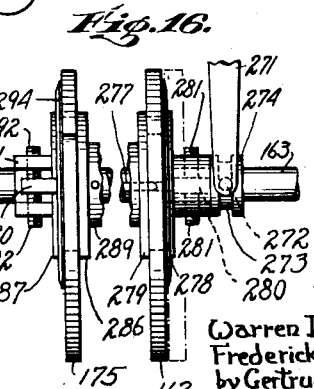
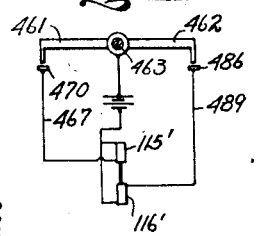
Inventors.
Warren Dunham Foster
Frederick Davenport Sweet, Dec'd
by Gertrude Sweet, Administratrix
By Warren Dunham Foster
Attorney.

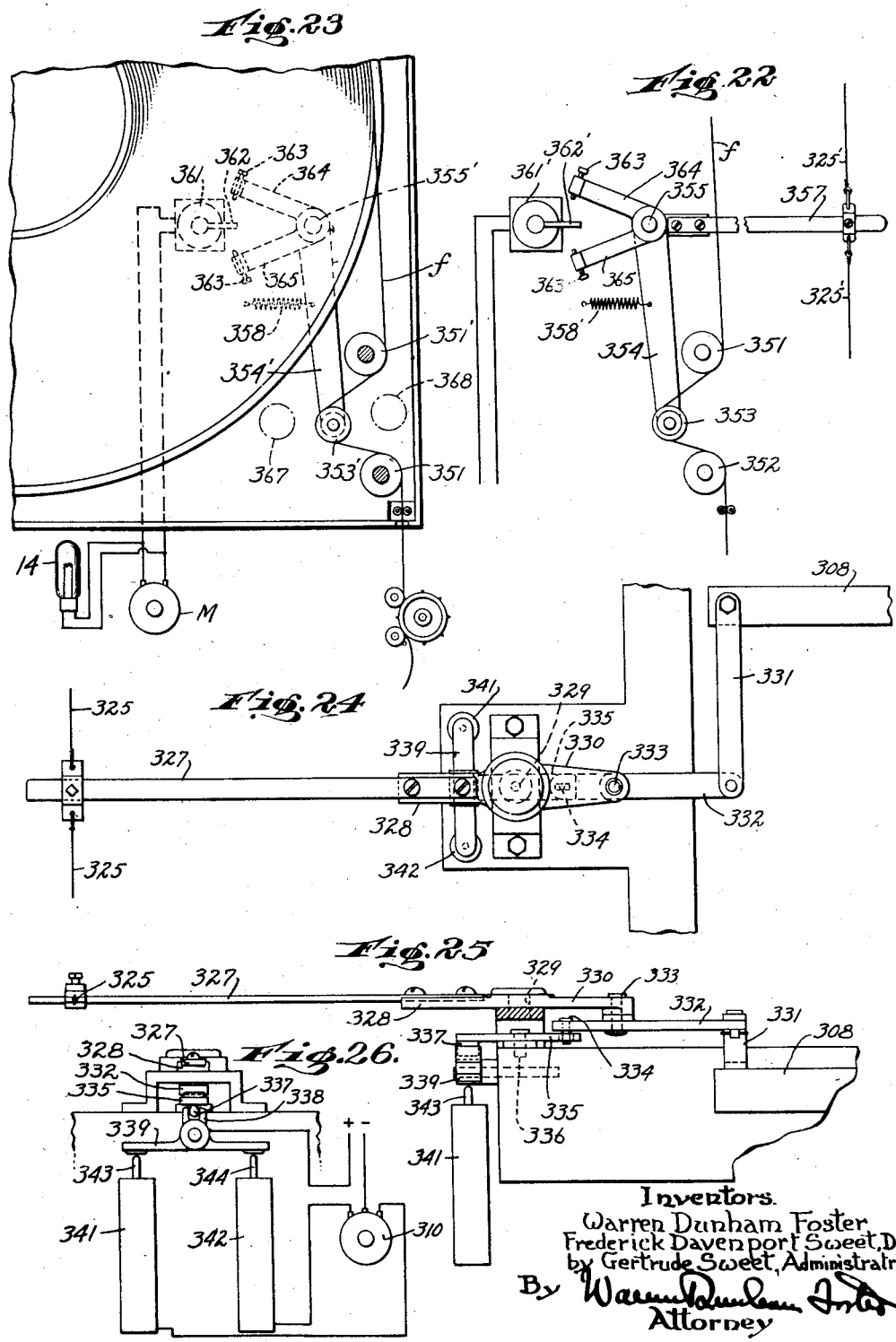

Patented Apr. 20, 1943

2,316,780

UNITED STATES PATENT OFFICE 2,316,780

FILM HANDLING APPARATUS

Warren Dunham Foster, Eustis, Fla., and Frederick Davenport Sweet, deceased, late of New York, N. Y., by Gertrude Sweet, administratrix, New York, N. Y., assignors to Kinatome Patents Corporation, Ridgewood, N. J., a corporation of New York Original application April 21, 1933, Serial No. 667,174. Divided and this application January 29, 1941, Serial No. 376,442

36 Claims. (Cl. 88—16.2)

The present invention relates broadly to the handling of films and more particularly to means for projecting or photographing motion pictures with provision for the reproduction of sound.

According to common practice in this art, that portion of a film from which pictures are projected is started and stopped generally twenty-four times per second while that portion from which sound is reproduced is moved continuously at a lineal speed of a foot and a half per second, an intervening loop or intervening loops of slack film providing the necessary compensation. It is essential for true and pleasing sound reproduction that this lineal speed be maintained as nearly constant as possible and without minor inequalities or "ripples." To this end, damping means of one type or another are applied to a film adjacent the point at which sound is translated therefrom in order to give as even a kinetic flow as possible and to "iron out" these minor irregularities. This invention deals primarily with the control of such damping means both alone and in cooperation with the control of other operable parts of the apparatus.

A chief object of this invention is automatically to render damping means associated with a sound head or sound translating device which is a part of or associated with a motion picture machine ineffective during a rewinding operation and during a threading operation and effective during projection. A related object is interconnection of the control of the damping means with that of an exciter lamp, photoelectric cell or other similar translating devices, a sound gate, and other operable elements of a motion picture apparatus, or with any thereof. A closely associated object is provision of control mechanism operatively interconnecting all of the operable parts of a film handling apparatus per se, such for example as means for alternatively driving a delivery reel in a projecting and rewinding direction, continuously rotating sprockets, presser members for all of such sprockets, a gate which holds a film in proper position for projecting a picture therefrom or exposing it so that a picture is recorded thereupon, an intermittent pulldown, guards or strippers movable to a position wherein they form a clear channel free from the teeth of film moving members, means for forming the necessary loops of slack film, a light source by means of which a picture may be projected, a take-up carrier which may be driven alternatively in a projecting and a rewinding direction, and various operable guides disposed between the carriers for alternatively establishing a threading or rewinding channel and a projecting channel. While we prefer to apply our invention to a fully developed automatic apparatus, among its objects is numbered provision of improved automatic control of the means for actuating damping means associated with a sound head in a desired or useful cooperation with any of the other operable parts of the apparatus associated with the projection or photography of a picture in distinction to the translation or recording of sound.

This application is a division of our co-pending application Serial Number 667,174, filed April 21, 1933, and issued upon March 4, 1941, as Patent Number 2,233,409. In our parent application we describe and claim a fully developed automatic apparatus in which an entire program of motion pictures may be projected and reprojected together with the accompanying sound with greatly decreased danger of fire and of damage to the film and expenditure of skilled labor. Such an apparatus as described therein and herein is of sufficient size automatically to handle an entire evening's program, for example accommodating up to twenty thousand feet of film or more. It should be understood, however, that our invention is not limited to such a large or completely automatic apparatus, but in many of its essential parts may be applied to much more simple machines including those adapted for home, school, industrial and other amateur use.

In apparatus constructed in accordance with the disclosure of our parent patent and of this application, a film is automatically threaded into operative position and after projection is thereupon rewound through a cleared channel free from the teeth of film moving elements such as sprockets or film pressing members such as movable gate sections or shoes. An important object of our invention is to free the film during rewinding from contact with damping means associated with a sound head and operative during a film feeding operation.

In our parent application and herein we describe means for positively driving both the delivery and take-up carriers at such speed both in projecting and rewinding directions that the lineal speed of a film being fed therefrom or thereto remains constant. An important object of our invention is the provision of automatically operative control mechanisms interlocking such speed-controlling devices and an operable damping device associated with a sound head, but it should be understood that our invention in many of its phases can be applied to conventional apparatus in which the one of these carriers from which a film is being delivered is rotated by the film itself and to a carrier which during a rewinding operation throughout a cleared channel is operated at a constant speed of revolution thereby winding up a film at a lineal speed which is not constant but increases as the mass upon the carrier increases.

Among the most important objects of this invention is the provision of improved control mechanism for these damping means both alone and in combination with the control mechanism of all of the other operable parts of the apparatus. Another important and related object is the actuation of such control mechanism by signals carried by the moving film. While we describe our invention as applied to an apparatus which presents a film having thereon both pictures and symbols representing sound, it will be understood by those skilled in the art that in many of its aspects it may be applied to an apparatus such as a film-playing phonograph for presenting a film carrying only sound symbols.

An important object of this invention is to provide improved film handling apparatus and control therefor.

In this description, our invention is applied to a motion picture projector, but it will be understood by those skilled in this art that many phases of it may be applied to apparatus for the photographing of pictures and recording or re-recording of sound or for duplicating or printing films particularly as by the step method.

Other objects, advantages and characteristics of our invention are apparent in the following description, the attached drawings and the subjoined claims. Although we are showing merely preferred embodiments of each of the several phases of our invention for purposes of illustration only, it will be readily understood that we are not limited to these particular constructions as changes can readily be made without departing from the spirit of the invention or the scope of the broader claims.

In the drawings:

Figure 1 is a side view of projecting and sound heads and a lamp house with magazines applied thereto.

Figure 2 is an end view corresponding to Figure 1.

Figure 3 is a view largely diagrammatic of the film handling members which are disposed between the magazines and the control mechanism therefor, the members being in projecting position, certain parts being omitted for clarity.

Figure 4 is a view of the sound head showing the members thereof in film threading or film rewinding position with the damping means having been automatically rendered inoperative.

Figure 5 is a view largely diagrammatic showing one method of automatically controlling the reversal of the apparatus.

Figure 6 is a view of a portion of one form of a control mechanism.

Figure 7 is a view taken on the lines 7—7 of Figure 6.

Figure 8 (sheet 3) is a detail view taken on the line 8—8 of Figure 7 showing certain details of a control mechanism.

Figure 9 is an enlarged view of a portion of the control mechanism shown in Figure 6.

Figure 10 is a section taken on the lines 10—10 of Figure 9.

Figure 11 is an end view corresponding to Figure 2 showing an alternative method of applying our invention in which the film itself controls the speed of operation of a delivery or take-up carrier or both.

Figure 12 is a side view of a magazine showing the carrier controlling means constructed according to this exemplification of our invention.

Figure 13 is a top plan view of the subject matter of Figure 12, including an enlarged portion of electrical control means.

Figure 14 is a side view of another and alternative method of applying our invention in which the speed of the delivery carrier or the take-up carrier or both of the same is controlled through rheostats for the driving motor or motors, these rheostats being mechanically controlled.

Figures 15 and 16 are enlarged views of certain cams which control the speed of operation of the delivery carrier and the take-up carrier.

Figure 17 is a side view of a damping device alternative to that shown in Figures 3 and 4. Figure 18 is a partial end view of the same. For the control of this damping device see Figure 27 upon sheet 2.

Figures 19 and 20 are side and top plan views respectively of another preferred form of timing device in which the control cams perform the double function of determining the speed of the two carriers and also actuating the means which time the projecting and rewinding cycles. Figure 21 is a circuit diagram of the preferred form of our invention shown in Figures 19 and 20.

Figure 22 is an enlarged detailed view of another preferred form of control mechanism embodying also two safety devices, one, a supported loop to compensate for minor irregularities in feed, and, two, a device for turning off the light and the motor circuits if the tension upon the film becomes too great or too little.

Figure 23 shows the two said safety devices, but independent of the timing control mechanism such as shown in Figure 22.

Figure 24 is a detailed top plan view of a portion of the control mechanism of the preferred form of our apparatus which is shown in Figures 11, 12 and 13, with particular reference to a timing control of the control motor. Figure 25 is a side view partially in section corresponding to Figure 24. Figure 26 is an end view partly in diagram corresponding to Figure 25.

Figure 27 (sheet 2) shows the control of the damping device of Figures 17 and 18.

Figure 28 is a wiring and operating diagram of a motor reversing switch.

In carrying out our invention we may employ a delivery magazine 11 from which film supported thereby is supplied to projection and sound heads shown generally at 12, and to a take-up magazine 13. A lamp house 14 of conventional type supplies light to the projecting head. As a main frame for the apparatus we may employ an irregularly shaped casting 15 extending upwardly from a base 16 and including latches 17 for the take-up magazine 13. These latches may include pins 18 mounted upon lugs 19 which extend to the left as viewed in Figure 2 from the casting 15. Springs 20 for the latch members 17 hold them in engagement within the take-up carrier 13. Similar attaching means including the latches 21, pins 22, lugs 23, and springs 24 may be provided for the delivery carrier. A bracket 26 is shown as supporting the heads generally shown as 12 and the lamp house 14.

The take-up magazine 13 is shown in Figures 1 and 2 as supported upon a truck 29 which is mounted upon wheels for which a track is provided, all for purposes pertinent to our parent patent but not to this application. According to a preferred embodiment of our parent invention, the delivery magazine is not ordinarily removed from contact with the apparatus, but, as described in the parent patent, such removal may be desirable and may be effectuated by mechanism therein described.

As previously stated, according to our invention, the film is delivered from the delivery carrier and taken up upon the take-up carrier at a uniform lineal speed and it is similarly rewound although at a much higher speed. Both carriers preferably are driven during each cycle. Intermediate the two carriers, the film passes through a picture and sound head, which is shown diagrammatically in Figure 3. Before describing the several means any one of which may be employed to drive the delivery and take-up carriers, we shall now describe the film feeding apparatus which may be common to all types of carriers.

Figure 3 shows this apparatus, largely diagrammatically.

From the delivery carrier 11 we feed the film downwardly to a continuously operating sprocket 51 against which the film may be pressed by a presser member 52 mounted upon a control plate 53. For removing the film from the teeth of the sprocket 51 and shielding it therefrom as during a threading or rewinding operation, we provide a shielding or stripper member 54 which may be constructed in the manner described and claimed in Patent Number 1,736,750 to Barton Allen Proctor, dated November 19, 1929, or in any other desired manner. Formed integrally with the shielding member 54 or attached thereto may be two gears 55 and 56 respectively, gear 55 engaging teeth 57 cut upon the control plate 53 and gear 56 engaging teeth cut upon a vertical control member 58, this construction being such as that which is described and claimed in some of its aspects in the application of Warren Dunham Foster, Serial Number 347,959, filed March 18, 1929, and co-pending with our parent patent, which upon August 18, 1936, matured as Patent Number 2,051,785.

As the film passes downwardly from the above described continuous delivery sprocket assembly, it may extend through an openable gate which includes a relatively fixed member 59 and a relatively movable member 60 and thereafter into contact with an intermittent or pull-down sprocket 62 with which there is associated a presser member 63 mounted upon a control plate 64 and a shielding member 65 including gears 66 and 67 which mesh respectively with teeth cut in the horizontal control plate 64 and the vertical control member 58, all as previously described for the continuous delivery sprocket. For operating the movable gate section 60, a member 69 is attached to or formed integrally with the control plate 64 for the presser member 63 and thereby moves the gate section 60 upon the movement of the control plate 64. A light source 70 is controlled by a switch 71 which is operated by an arm 72 operated by a pin in the control member 64. Thus it will be seen that as the gate is opened and closed the light source is rendered alternatively operative and inoperative. For purposes of illustration an incandescent light source is shown, but it will be readily understood that a carbon arc may be employed if desired. The term "picture head" or "picture station" is applied to this gate and its associated parts.

The construction and operation of the parts associated with the continuous taking-up sprocket 75 are similar to those described above. A presser member 76 is mounted upon a control plate 77 and a shielding member 78 is associated with this sprocket. Movable with this shielding member also are teeth 79 and 80 which co-act with appropriate teeth cut in the plate 77 and the control member 58 respectively so that these parts are operated in timed relation to each other and to the operation of the previously described parts.

The drive for the continuous sprockets and the intermittent sprocket is not shown, since it may be of any desired or conventional type. We prefer to render this drive inoperative during threading or rewinding by automatic mechanism, operatively interconnected with the control member 58, as for example is shown in our application Serial Number 653,140, filed January 23, 1933, and co-pending with our parent patent, which upon August 18, 1936, matured as Patent Number 2,051,036. It should also be noted that the construction shown in Figure 5 hereof is adapted to accomplish this result by means illustrated and claimed in Patent Number 1,943,303, issued January 16, 1934, upon an application filed by the applicant Foster hereof and co-pending with our parent patent, to which more specific reference is made later herein.

From the continuous take-up sprocket 75 the film passes downwardly, as viewed in Figure 3, through the sound head. This sound head or sound station is shown as provided with a fixed gate section 82 and a movable gate section 83 with which is associated an optical element 84 which focuses the light from an exciter lamp 85 upon a photo-electric cell 86 or its equivalent. The optical element is preferably movable with the gate. A continuous sound sprocket 87, driven in any conventional manner and controlled as are the other sprockets, may be provided together with a presser member 88 mounted as before upon a control plate 89. A shielding member 90 associated with the sprocket 87 may have teeth 91 and 92 movable therewith to cooperate, as previously described, with appropriate teeth cut in the control plate 89 and control member 58 respectively. To operate the movable section 83 of the sound gate a member 94 is attached to or formed integrally with the control plate 89. To control the exciter lamp 85 a switch 96 is operated by an arm 97 which through an appropriate pin and slot connection is operated by the movement of the control plate 89. Similar mechanism is provided for the photo-electric cell 86, this mechanism including a switch 98 operated by an arm 99 which is moved through an appropriate pin and slot connection by the control plate 89.

Between the sound head and the take-up carrier, we supply appropriate damping means which we render operative and inoperative in accordance with the direction of movement of the film. That is to say, while the film is moving in a projecting direction and pictures are being shown therefrom and sound reproduced, we render the damping means effective, but while the film is being rewound clear of the teeth of the sprockets and at a higher rate of speed we render the damping means ineffective in order to save wear and tear upon the fragile film. Also, we move the damping means to inoperative position and hence out of the way prior to the threading operation. The damping means which we employ may be of any desired type. Two are shown for purposes of illustration, one in Figures 3 and 4 and the other in Figures 17, 18 and 27.

The damping means shown in Figure 3 includes two smooth rollers 101 and 102 mounted for free rotation upon an arm 103 which is pivoted upon a stud 104. For convenience, these rollers are shown as engaging the film between the continuous sound sprocket 87 and the take-up carrier, but as will readily be understood by those skilled in the art they may be disposed in any desired relation to the point at which the sound is translated. Attached to this stud to the rear of the arm 103, as shown in Figure 3, is a small gear 105 which meshes with teeth 106 cut in a control member 107 which is attached to or formed integrally wtih the control member 89. Thus it will be understood that the transverse movement of the control member 89 and the lower portion of the member 107 attached thereto and movable therewith will be effective for rocking the arm 103 and moving the rollers 101 and 102 from the position shown in Figure 3 to that shown in Figure 4.

The film $f$ extends from the above described damping mechanism to a throat 109 leading to the take-up magazine 13. Suitable fire preventing means are of course applied to this throat.

Any preferred means may be employed to create the necessary unsupported loops of slack film between the continuous delivery sprocket 51 and the intermittent sprocket 62, and between the intermittent sprocket 62 and the continuous take-up sprocket 75. We may prefer to use that described and claimed in the above mentioned Foster Patent Number 2,051,785 dated August 18, 1936, or in his Patent Number 1,943,305 dated January 16, 1934, or in Patents Number 1,993,735, issued March 12, 1935, or 2,051,036, issued August 18, 1936, respectively, upon applications filed by us, all of said patents having been co-pending with the parent hereof. It will be understood however that we are not limited to any particular type of automatic loop forming. In any event, however, we much prefer that the loop forming device which is used be definitely correlated to the control mechanism herein described, preferably in accordance with the teaching of the above mentioned applications.

A control mechanism for the above described sound and picture heads will now be described.

An operating arm 111 may be pivoted upon a control shaft 112. From the right hand portion of this arm as viewed in Figure 3, a connection 113 extends to the vertical control member 58. To rock this arm and hence operate this control member 58 and with it all of the operable parts of this portion of the apparatus, two oppositely acting solenoids 115 and 116 may be attached in any appropriate manner to the left hand end of the arm 111 as shown in the drawings. It will be readily understood that when the solenoids are in the position shown in Figures 3 and 5, for example, the apparatus will be effective for projecting pictures and reproducing sound. When, however, the solenoids are moved from the position shown in Figure 3, the arm 58 will be moved downwardly. This movement will be effective to move the presser members 52, 63, 76 and 88 away from their appropriate sprockets, to rotate the shielding members 54, 65, 78 and 90 respectively to shielding position whereby the film is stripped from the teeth of the sprockets 51, 62, 75 and 87 respectively and to open the picture gate and sound gate by moving the sections 60 and 83 away from the fixed sections 59 and 82 respectively. Such movement will also break the circuits to the projection light 70 and exciter lamp 85 and to the photo-electric cell 86. Such movement also will render the damping means ineffective. With the parts in such position, an initial threading or a rewinding operation may be carried out. Figure 4 shows the sound head in such position.

Under some circumstances, it is desirable to introduce sequential movement of the gate members, presser members, and film removing and protecting members. In such cases, we may use the mechanisms described and claimed in Patents Number 1,996,759, dated April 9, 1935, or 1,954,808, dated September 17, 1934, or 2,056,848, dated October 6, 1936, or 2,056,846, dated October 6, 1936, each issued upon an application filed by us during the pendency of our parent patent.

From the previous portion of this specification it will be obvious that the change from the projecting position to the rewinding position should come when the film is largely removed from the delivery carrier and largely coiled upon the take-up carrier. Similarly, after the film has been largely rewound upon the delivery carrier the parts should then be moved back to the projecting position.

To accomplish these changes the solenoids 115 and 116 are alternatively energized. Where desired, other means may be employed to accomplish this end but we may prefer to make use of those described and claimed in the application, co-pending with the parent hereof, of Warren Dunham Foster, Serial Number 57,392, filed September 19, 1925, which upon January 16, 1934, matured as Patent Number 1,943,303. For purposes of illustration we are showing a specific improvement over the control means employed in said co-pending application.

As clearly shown in Figure 5, one lead of the circuit 117 is electrically connected to a pivot 118 upon which an arm 119 is mounted which in turn supports a roller 120 which is adapted to contact with an edge of the film and rides thereupon. It may be held in contact with the film either by its own weight or by a suitable spring not shown. The other lead of the circuit 117 is shown as attached to a roller 121 formed of conducting material and mounted upon a shaft 122 upon the side of the film opposite that upon which the roller 120 rides. A cut out portion 123 of the edge of the film obviously will cause the roller 120 to make contact with the roller 121 thus closing the circuit 117 and energizing the solenoid 115 which thereupon draws downwardly the link 113 and the control member 58 thereby operating the operable film engaging elements and switches associated with projecting and sound heads as previously described and best illustrated in Figure 3. It will of course be understood that the cut out portion 123 is placed adjacent the trailing end of the film so that the reversal will be timed after the film has been entirely projected, save for the "trailer."

A switch 124, either manually or automatically operable, is introduced into the circuit 117 so that this circuit may be opened or closed independently of the film, so that the operator may initially rewind the film from the take-up carrier back to the delivery carrier, after the take-up carrier has been first loaded as described in our parent patent, and otherwise manipulate the apparatus independently of the automatic control.

The solenoid 116 may be controlled similarly to the solenoid 115. A circuit 127 may have one lead connected to a shaft 128 upon which is mounted an arm 129 which supports a roller 130 which travels upon an edge of the film. The other lead of the circuit 127 may be attached to a conductive roller 131 mounted upon a shaft 132 and placed upon the opposite side of the film and in substantial alignment with the roller 130 so that when a cut out edge portion of the film is brought between the rollers the circuit 127 will be closed. A switch element 134 is also introduced into the circuit 127.

In the interests of simplicity, circuits 117 and 127 respectively have been shown as directly controlling the solenoids 115 and 116. As a matter of fact, however, we prefer to control these solenoids through any desired or conventional relay devices so that a current of extremely low voltage and amperage may be employed. It will be of course readily understood that we are not limiting ourselves to the control devices which are shown in the said Patent Number 1,943,303. Any other preferred device may be used such as for example, those shown in the application, co-pending with the parent hereof, of Barton Allen Proctor, Serial Number 641,812, filed November 8, 1932, which matured as Patent Number 2,007,214.

If desired, mechanical timing devices for effecting the alternations of directional movement may be employed, preferably such as those described and claimed in Patent Number 1,695,857, dated December 18, 1928, to the said Proctor or in his Patent Number 1,944,034, dated January 16, 1934, and issued upon an application co-pending with the parent hereof.

We may employ braking means for either or both carriers, operatively interconnected with the control mechanism hereof, in the manner taught by the said Proctor in Patent Number 1,944,035, dated January 16, 1934, or by the applicant Foster in Patent Number 1,943,304, both issued upon applications which were co-pending with the parent hereof.

In the succeeding portion of this specification alternative means are described for accomplishing these alternations in movement, such means being associated with the delivery carrier and the take-up carrier and if desired, with the means for controlling the speed of operation of the said carriers. If desired, however, one may employ photo-electrical control means such as those described and claimed in the application, co-pending with the parent hereof, of Warren Dunham Foster and Earle Parmelee, which upon January 16, 1934, matured as Patent Number 1,944,024.

As previously stated, an important part of our parent invention is provision of means for continuously driving both the delivery and take-up carriers at a constant speed during the entire feeding and rewinding operation irrespective of the diameter of the mass of film as it increases upon each carrier. The control of such means in predetermined relation to the control of other operable elements, as for example, damping means, is an important part of the invention claimed herein. We prefer to drive both the delivery and take-up carriers at a number of revolutions per minute differing at such rate as to maintain the lineal speed of the film constant as at ninety feet per minute, the standard rate for sound film operation.

In our application Serial Number 352,525 filed April 4, 1929, co-pending with our parent application, which upon March 12, 1935, matured as Patent Number 1,993,735, we show means for continuously driving a delivery carrier primarily during the first portion of a feeding operation to supply film to the continuous delivery sprocket and through it to the remainder of the mechanism. In our parent patent we go a step further and continuously drive the delivery carrier throughout the entire feeding operation instead of permitting it to be revolved by the traction of the film as it is moved by a continuous delivery sprocket. Such continuous driving of the delivery carrier should not be confused with the many attempts which have been made and given up positively to drive a delivery carrier in step with an intermittent pull-down.

As those skilled in the art are also aware, according to conventional practice a take-up carrier is ordinarily driven continuously at a rate of speed higher than the maximum rate of progression of the film through the apparatus and, as a result of the operation of a slip clutch of some sort between the take-up carrier and its drive, with enough slippage so that the carrier does not run ahead of the delivery of film thereto by a continuous take-up sprocket. This take-up sprocket, often called a "hold-back sprocket," prevents the take-up carrier from pulling directly against the teeth of the intermittent pull-down. If, as described in our parent patent, we project a relatively large length of film, we prefer not to subject the film to the relatively great strain of this type of take-up. Consequently we may prefer to drive the take-up as well as the delivery carrier in a projecting direction at a rate of speed in terms of revolutions per minute which constantly varies as the mass changes so that the winding up operation is positively carried out at a constant lineal speed. According to our invention, therefore, by mechanical means the entire mass of the film, always excepting a small section associated directly with the intermittent pull-down may be moved through the apparatus at a continuous speed without strain caused by the drag of a delivery carrier or the over-running of a take-up carrier.

In a rewinding operation through a cleared channel, such as we provide, it is particularly desirable to drive a delivery carrier, which for the purposes of the rewinding operation has become a take-up carrier, at such speed that the lineal speed of the film, ordinarily rewound at a high speed, remains constant.

As previously stated, however, it is not necessary that we employ this positive drive and in apparatus especially constructed for school, church, industrial or other amateur use we may omit it altogether. In those instances in which we do employ such positive drive, we much prefer to control the application of the necessary driving devices in interlocked relation with the operation of damping means for the sound head. Also, it is especially desirable to employ a drive for the delivery carrier (then serving as a take-up carrier) during a rewinding operation which maintains constant the lineal speed of the film being rewound. Under such circumstances, we much prefer to employ interlocking control mechanism which renders inoperative whatever damping means are employed and at the same time automatically changes the number of revolutions per minute of the delivery carrier at whatever predetermined rate is necessary to maintain a constant lineal speed.

In order to drive a shaft 135 of the delivery carrier at continuously varying rates of speed, we may employ any desired mechanical or electrical means. For purposes of illustration we show in Figures 2, 6 and 11, various modifications of the so-called Reeves drive. A belt 136, comprised of wedge shaped portions, passes between laterally movable cones 137 and 138, which together form the pulley for the delivery shaft 135, and two similar cones 139 and 140, which in a similar manner are laterally movable upon and in addition driven by a shaft 141. Through miter gears 142 and 143 shaft 141 may be driven by an operating shaft 144, which may be driven by a main motor M of the apparatus, as later described. It will be readily understood by those skilled in the art of mechanics that as the cones 137 and 138 are moved as by being brought closer together, for example, and the cones 139 and 140 are moved as by being further separated, the speed of the shaft 135 will be quickly increased. Such movement in either direction is readily obtained. The hubs of pulleys 138 and 139 and 137 and 140 respectively are connected by control levers 145 and 146 which are pivoted upon a transverse bar 147. Movement may be communicated to the control members 145 and 146 by right and left hand screws cut in a shaft 149 and cooperating with suitable threads formed in the ends of control levers 145 and 146. It will be understood, therefore, that the rotation of the shaft 149 in one direction will gradually increase the speed at which the shaft 141 drives the shaft 135 and hence the delivery carrier and that rotation of the shaft 149 in the other direction will rapidly and very accurately decrease such movement, as for the later rewinding operation during which the delivery carrier acts as a take-up carrier. For revolving the shaft 149 a pulley 151 may be attached thereto and operated as by a chain 152.

Movement may be communicated to this chain 152 in direct relation to the building up or the reducing of the mass of film upon the carrier in the following preferred manner as is well shown in Figures 6 and 7: Upon a shaft 153, a sprocket wheel 154 may be applied, as is also a pinion 155 which in turn is operated by a segmental rack 156, which is supported upon and formed integrally with an arm 157 journaled upon a stub shaft 158, which is mounted upon a long irregularly shaped bracket 159. Formed integrally with the arm 157 or attached thereto is a short operating lever 160 to the extremity of which is journaled a cam follower or control roller 161. This control roller 161 engages the surface of an adjustable cam 162 which in a manner later described in detail is adjustably connected with a shaft 163. This cam is plotted in accordance with the differing diameter of the mass of film upon the delivery carrier. Therefore the revolution of this cam in accordance with the feeding of film through the apparatus will vary the speed of revolution of the delivery shaft 135 exactly as the mass of film thereupon decreases or builds up. With the parts as in the position shown in Figure 6 the projecting operation is about to be concluded and the rewinding operation is about to begin.

For driving the take-up carrier in the same direction as that in which the delivery carrier is driven and at an always corresponding speed, similar mechanism may be employed. A sprocket chain 166 corresponds to the sprocket chain 152 and drives the speed controlling device of the delivery carrier in exactly the same manner as that in which the speed controlling device of the delivery carrier is driven. The chain 166 is driven by a sprocket wheel 167 attached to a stub shaft 168 with which moves a pinion 169 which is driven by a segmental rack 170 mounted upon or formed integrally with a lever arm 171 (Figure 6) which is pivoted upon a stub shaft 172 supported by the bracket 159. Extending from the arm 171 or formed integrally therewith is a short lever 173 upon the extremity of which is journaled a cam follower or control roller 174 which engages a take-up control cam 175 which is adjustably mounted in a manner later described in detail upon the shaft 163. The shaft 163 is driven by a large gear 178 which in turn is driven by a pinion 179 which revolves with a worm gear 180 which in turn is driven by a worm 181 attached to the main operating shaft 144. It will be readily understood that this reduction is very great. The gearing shown for purposes of illustration reduces the speed of the power shaft 144 two thousand to one. The sprocket chain 166 leads to and controls parts in the control mechanism for the take-up carrier which exactly correspond to those in the control mechanism for the delivery mechanism. Consequently they are not described. In the drawings the same reference characters are applied to the elements in this take-up mechanism as are applied to the corresponding elements in the delivery mechanism, but with a prime character added.

From the foregoing portion of this description it will be evident that these two carriers must be driven to meet three different sets of conditions. In a preferred form of our invention as previously stated, the take-up carrier alone is first driven in a projecting direction solely for the purpose of loading it with the separate films which are to be joined in order to constitute the program. This loading operation can be carried out at a high speed since the film moves continuously. During the loading operation all of the apparatus, except the take-up carrier, should be inoperable and the damping means in inoperative position ready for the rewinding and threading operations which follow. After the film has been loaded upon the take-up carrier, preferably if for theatrical use with the film carried upon a plurality of small reels such as those upon which it is mounted at a film exchange united upon one larger take-up carrier, it must be rewound through a cleared channel in the apparatus back to the delivery carrier ready for the first presentation, this rewinding operation likewise being carried out at high and preferably constant lineal speed and without interference from damping devices. Thereafter the film must be regularly projected through the apparatus at a normal projection speed of, say, ninety feet per minute, and with the damping means operative. From this point onwardly automatic rewinding at high speed through a channel cleared of damping means and other interfering devices and automatic showing at regular speed will be alternately continued in a fully developed apparatus. It is obvious, therefore, that three different drives must be provided together with unitary control means which will absolutely prevent any mechanical conflict of any kind or any ill results if the operator is careless.

Preferred means for accomplishing the above results are shown in Figures 6, 9 and 10. Figure 9 is an enlargement of the lower left hand corner of Figure 6 from which certain reference numerals have been omitted for purposes of clarity.

To revolve the operating shaft 144 in a projecting direction but at high speed, in order initially to load the take-up carrier the following mechanism may be employed:

A double faced miter gear with teeth 185 is provided pinned to the shaft 144. These teeth mesh with those of a miter gear 186 attached to a shaft 187 journaled as in a bracket 188. A clutch member 189 is attached to the opposite end of this shaft. Opposite this clutch member is a cooperating clutch member 190 attached to a shaft 191 which is journaled as in a bracket 193 and driven by a pinion 194. To move these clutch members 189 and 190 into and out of operative relation one with the other, a depending control plate 196 may be provided. Attached to this plate is a plate 197 so constructed as to extend to the other side of the shaft 191 and so, with plate 196, to complete a clutch operating yoke. Pins 198 and 199 operating in cam slots 201 in the control plates 196 and 197 will move the clutch member 190 to and from operative relation with the member 189 upon the lowering and raising of the plate 196.

In order to carry out the regular projecting operation it is necessary to drive the operating shaft 144 in a projecting direction but at normal projecting speed. This result may be accomplished as follows:

A lower face 202 of the previously described miter gear structure carrying the teeth 185 engages with teeth 203 of a miter gear attached to and revoluble with a shaft 204, likewise journaled in the bracket 188. To the left hand portion of this shaft, as viewed in Figure 9, a clutch element 205 is attached which is shown as in engagement with a clutch element 206 which in turn is splined to a shaft 207, this shaft being revoluble with the worm gear 208. This clutch is rendered operative and inoperative by pins 210 formed in or attached to yoke members 211 which are constructed for movement with the control shaft 112 previously described. The rotation of this shaft in a clockwise direction as viewed in Figure 9 will be effective to render the clutch operative and its movement in an anti-clockwise direction will be effective to render the clutch inoperative. The operation of the control shaft 112, which may be accomplished either manually or automatically, is elsewhere described. A bracket 214 may be supplied for supporting the control shaft.

In order to drive the operating shaft 144 in a rewinding direction and at high speed the following mechanism may be employed, as can be clearly seen by an examination of Figures 9 and 10.

A miter gear 217 fixed to the operating shaft 144 engages with and is driven by a miter gear 218 attached to a shaft 219 likewise journaled in the bracket 188. To the other end of this shaft a clutch member 220 may be applied, a similar member 221 being attached to shaft 222, in line with shaft 219, which is driven by a pinion 223. To operate this rewinding clutch, yoke arms 225 may depend from the control device previously described for the regular projection clutch, pins 226 operating in appropriate grooves 227 in the clutch member 221. The rotation of the control shaft 112 in an anti-clockwise direction will be effective to render the rewinding clutch operative by engagement between the members 220 and 221 and movement thereof in a contrary direction will be effective to render the clutch inoperative. It will be readily understood that the regular projection and the rewind clutches must never be in engagement at the same time and the above described mechanism very simply accomplishes this result.

It will likewise be understood that at no time must the regular projection clutch and the high speed projection clutch be in simultaneous operation, no matter what mistake the operator may make. Neither should the high speed projection or the rewinding clutch be simultaneously in operative position. Positive protection upon these points is very simply provided. The depending control plate 196 is extended sufficiently far downwardly as viewed in the drawings to form contact at its lower enlarged extremity 229 with rollers 230 and 231 mounted in lateral extensions 232 extending from or formed integrally with the yoke structure made up of members 211 and 225. By reason of the above construction it will be evident that when the control shaft 112 is rotated in clockwise direction to open the high speed rewinding clutch that act will cause contact between the roller 230 and the depending portion 229 of the control plate 196 and raise both of the same thereby declutching the high speed projection clutch so that only the regular projection clutch will be operative or operable. Similarly a counter-clockwise movement of the control shaft 112, as for the purpose of opening the regular projection clutch and closing the rewinding clutch, through the contact of the roller 231 with the depending portion 229 will likewise make certain that the high speed projection clutch is inoperative and inoperable. No conflict between the regular projection and rewinding clutches is possible since both are alternatively operated by the same structure, which in turn is controlled, as above described, in interlocked relation to the high speed projection clutch.

In order to drive the high speed projection and high speed rewinding driving shafts in appropriate and opposite directions, a gear 234 is provided attached to the worm wheel 208 and in engagement with the pinions 194 and 223 respectively. This worm wheel 208 in turn is driven by a worm 235 attached to the motor shaft 236.

It will be understood from the preceding portion of this specification that the operating shaft 144, which is selectively powered in the manner previously described by the shaft 236 and motor M, drives merely the delivery and take-up carriers and the control mechanism therefor and does not drive the head. For driving the head an independent mechanism is provided but one which is controlled in complete harmony with the previously described mechanism.

To drive the head a shaft 240 is provided supported as in the bearing 241 (Figure 7). It will be readily understood that this shaft for driving the head must be declutched both when the film is being initially loaded into the take-up carrier and also while the film is being rewound. To accomplish this result, a double clutch control member having control annuli 242 and 243 is feathered or splined to the shaft 240. Formed on the lower end of this double clutch member is a clutch face 245. It will be understood that the raising of this mechanism as viewed in Figure 7 will bring the driven clutch face 245 out of contact with the driving clutch face 246 which is attached to a driving shaft 247 journaled as in the bearing bracket 248'. Means for raising this operable double clutch member will later be described. The driving shaft 247 is in turn driven by miter gears 248 and 249 which are attached to and driven by the previously described motor shaft 236.

In order to disconnect the projection and sound heads, which during a projection operation are driven through a power train which includes the above described devices, in order to save wear and tear on the mechanism during a rewinding operation, a clutch yoke 251 including pins 252 engaging with the clutch control annulus 243 as clearly shown in Figure 7, is mounted upon a pivoted arm 254, which arm is rocked upon its pivot by a depending control link 255. As is clearly shown in Figure 10, this control rod is attached to the control shaft 112 as by a loose pin fixed upon a collar 256 so that the rotation of the control shaft 112 moves the control link 255 upwardly and downwardly as viewed in the drawings. As elsewhere stated, the control shaft 112 may be operated by hand or automatically.

To declutch the head operating shaft 240 during the preliminary loading of the carrier, another clutch control is provided, likewise as shown in Figure 7. A rocking arm 257 is pivoted upon a pin 258 so that the right hand member thereof, which is formed into a yoke, through pins 259 operates the previously described clutch operating annulus 242. This clutch annulus and the clutch annulus 243 are moved by the respective pins against the power of a spring 260. The power of this spring moves the clutch control elements downwardly, as viewed in Figure 7 and is clearly apparent therefrom, when the pressure of the pins is released. By an inspection of Figure 7 it will be clearly understood that there is no conflict between these two clutch members since either may operate to move upwardly without conflict the two annuli and mechanism carried thereby.

The pivoted control arm 257 in its left side, as viewed in the drawings, is loosely pinned to and operated by a control link 263. The lower portion of this control link 263, as will be readily apparent from Figures 9 and 10, is attached to and operates the depending control plate 196, which, as previously described, operates the high speed projection or loading clutch. The other or upward portion of the control link 263 is attached to a hand operated device shown in Figure 7 which the operator uses when he wishes to load the take-up carrier.

It will of course be understood that when the take-up carrier is initially loaded it is desirable to stop the operation of the delivery carrier, both to save wear and avoid destroying the timing of the carrier driving mechanisms. This result is very simply accomplished by a clutch controlling the upper portion of the operating shaft 144, as shown in Figures 6 and 7. A control handle 264 may be pivoted as upon 265 at the top of the control box, as shown in the drawings. Pins 266 attached to the handle 264 work in a slot 267 of clutch member 268 and move it up and down in accordance with the movement of the handle 264 and therefore into and out of engagement with a clutch member 269 of the upward extension, as viewed in the drawings, of the operating shaft 144, this "extension" being of course a separate aligned shaft. As previously described, movement of this handle 264 also moves link 263 and declutches the shaft 240 which drives the projection and sound heads. Alternative automatic operation is carried out by shaft 112 under the influence of solenoids 115 and 116. Also as previously described, rollers 230 and 231 prevent conflict.

For reasons, which are discussed elsewhere in this specification, it is necessary to remove the cam 162, which controls the delivery carrier, from operative relation to its driving shaft 163 during the loading of the take-up carrier. This result is accomplished as is clearly shown in Figures 7 and 16 of the drawings. A depending portion 271 of the rocking control arm 257 terminates in a yoke in which are mounted control pins 272 working in a slot 273 of a shoulder 274 of a mounting plate 278 to which the control cam 162 is attached, as is best shown in Figure 16. This shoulder, while positioned in the position shown in dot and dash lines in Figure 16, is freely rotatable upon the shaft 163 but when by the mechanism above described the shoulder and the parts attached thereto are moved into the position shown in full line in Figure 16 a feather 277 in the shaft 163 causes the cam to rotate with the shaft. This feather is so constructed, as by the portion upon one side of the shaft being of a size different from that of the portion upon the other side thereof, the cooperating openings in the shoulder being appropriately shaped, that the cam can be positioned upon the shaft only in predetermined relation thereto.

The cam 162 is held between plates 278 and 279 which may be attached to each other by screws, not shown, which extend through a relatively large opening in the center of the control cam, as will be more fully understood by a consideration of the similarly constructed mounting of cam 175 which later will be described. A tongue 280, extending from the plate 278 to the right as viewed in Figure 16, may be held as between set screws 281 for purposes of fine adjustment as later described. It will thus be seen that the movement of the clutch arm 271 will move this entire assembly so that the cam surface 162 will be brought into and out of operative relation with the cam follower 161.

It is obviously necessary to adjust each cam in its relation to its follower under certain conditions. Figures 15 and 16 show how such adjustment can be obtained. The following description applies to the cam 175, but it will be understood that the cam 162 is similarly mounted. The cam 175, which has a central opening, is placed between plates 286 and 287. Screws 288 hold the plates 286 and 287 in close relation to each other and press against the cam therebetween. This pressure is sufficient to cause the structure to revolve as a unit under normal conditions, but to permit manual rotation of the cam independently of the plates. The two plates 286 and 287 are attached to and revoluble with a hub 289 which is pinned to the shaft 163. It will be understood, of course, that the hub of the delivery cam assembly is not so pinned, in view of the previously described means for moving it along the axis of the shaft. A tongue 290 extends from this hub to the left as viewed in Figure 16. A split collar 291 is so disposed that adjusting screws 292 placed therein bear against the tongue 290. A bolt 293 holds the collar in relation to the shaft. It will be readily understood, therefore, that as the bolt 293 is released the entire assembly can be rotated upon the shaft. With the approximate adjustment which is desired obtained as above, the operator will tighten the bolt 293 and will secure his fine adjustment by appropriate movement of the screws 292, being guided by calibrations suitably placed upon a shoulder 294 of the mounting plate 287.

For operating the entire control mechanism by hand without interfering with automatic operation, the mechanism shown in Figures 7 and 8 may be employed. Fixed to the shaft 112 is a manual control lever 295 having at its upward extremity as viewed in the drawings a pin 296 extending through the lever 295 for engagement with appropriate control stations 297 and 298 formed or placed in the adjacent side of the casing. A convenient manual operating knob 299 is provided upon the upward end of the lever. This detent structure is urged inwardly or toward the casing by a spring, not shown. A pin 300 operating in an appropriate slot serves to guide the knob and pin 296 and also when desired to maintain the pin free from locking relation with the stations 297 and 298. When the knob 299 is drawn away from the casing, it may be rotated slightly as soon as the pin 300 escapes from its slot with the result that the detent will be held out of locked relation with the stations so that the automatic operation of the apparatus may be carried out without interference. This arrangement in its broader aspects is such as that described and claimed in the application of Warren Dunham Foster, Serial Number 57,392, co-pending with the parent hereof, filed September 18, 1925, now Patent Number 1,943,303, dated January 16, 1934.

From the foregoing description and by reference to the drawings it will be understood that this operation of the control shaft 112 through the linkage shown in Figure 3 will bring the damping mechanism comprising the rollers 101 and 102 or the alternative device later described into its inoperative position thus freeing the film from tension and making threading easier. It will thus be seen that we provide mechanism for controlling operable damping means in interlocked relation to the control of the system of clutches previously described and best illustrated in Figures 9 and 10. Even though the complete mechanism of our parent patent including the loading machine therein described and claimed is not employed, this operative interlock between the triple clutch and damping mechanism is particularly useful because it makes possible the rapid revolution of the take-up spindle in a projecting direction so that any convenient amount of film as, for example, two reels may be quickly wound thereupon, the trailing end of the first being attached to the leading end of the second. Since reels ordinarily come from a film exchange, whether for amateur or professional use, wound ready for projection, if two are to be joined together and placed upon a relatively large carrier, it is necessary to wind the first upon the large carrier so that the previously trailing end is accessible in order that the leading end of the second reel may be attached thereto. It is then necessary that the user further wind the large carrier so that the leading end of the second reel is accessible in order that it may be rewound upon a large delivery reel ready for showing. The above described mechanism makes it possible easily and simply to carry out this operation within the projecting machine itself and consequently to dispense with a separate mechanism for this purpose. After the film has been very rapidly wound upon the take-up reel within the machine, its then trailing end is attached to the delivery reel and the film quickly rewound through a clear channel and without interference by damping means and upon a delivery carrier upon spindle 135 thus preparing it for projection.

Under certain conditions, it may be desirable to control the drive of the delivery carrier and the take-up carrier by means responsive to the film itself, such means, in turn, being operatively interconnected with the means which operate the damping devices. Mechanism to accomplish this end is illustrated in Figures 11, 12, 13, 22, 24, 25 and 26 of the drawings. A driving shaft 301 for a delivery carrier 11' may have splined upon it cones 302 which are movable along the axis of the shaft. Upon a driving shaft 304, supported adjacent and parallel to shaft 301, there may be mounted cones 305 for movement along the axis of the shaft, the movement of the cones of the two pairs thereof in the manner previously described clearly being effective to cause a V shaped belt 306 to operate the shaft 301 at the different speeds. For moving the cones laterally along the axes of the respective shafts, control levers or plates 307 and 308 may be centrally pivoted as previously described and attached to the several cones so that movement of those levers upon their pivots will be effective to increase and decrease the effective size of the two pulleys. To move these levers or plates, a screw 309 is driven by an auxiliary motor 310. It will be understood, therefore, that the revolution of this motor in one direction will be effective to increase the speed at which the shaft 301 is driven by the shaft 304, and the revolution of the motor in the opposite direction will have the opposite effect. To drive the shaft 304, a sprocket chain 311 passes between appropriate sprocket wheels 312 and 313. A driving motor 314 through a gear box generally shown as 316 is effective for driving the wheels 312 and 313.

One means for operating the control motor 310 is shown in Figures 12, 13, 24, 25 and 26 of the drawings. A light arm 317, as best shown in Figure 12, carrying a film contacting roller 318 is pivoted at 319 upon an arm 320 to which an adjustable weight 321 is attached. A short lever 322 projects from the pivotal point and is movable with the arms 317 and 320. To the lower end 324 of this lever is attached a cord 325 which passes over pulleys 326 to operate a long operating lever 327.

The means by which the movement of the cord 325 through this long lever 327 controls the control motor 310 will be understood by reference to Figures 24, 25 and 26 (sheet 3). The long lever 327 is attached to and movable with a plate 328 which is pivoted at 329. A short lever arm 330 may extend from this plate, or be formed integrally therewith, to the right as viewed in Figures 24 and 25. A link 331 is loosely connected to the end of the pivoted control arm 308 of the drive and is loosely connected at its opposite extremity to a link 332. A pin 333 joins the lever arm 330 to the link 332 while allowing relative motion therebetween. By means of a pin 334 in its extremity opposite to that to which is connected the link 331, the link 332 is loosely connected to an arm 335 which is pivoted upon a pin 336. From the opposite extremity of this arm, a depending projection 337 engages the arms of a yoke 338 therebetween which operates a rocker arm 339 to control the motor 310. Two carbon piles 341 and 342, operated respectively by plungers 343 and 344, are controlled by the movement of the rocker arm 339, and in turn, through the circuit shown in Figure 26, control the speed and direction of the motor 310. It will be readily understood that the downward movement of the left hand portion of the rocker arm 339, as viewed in Figure 26, will compress the carbon pile 341, and the downward movement of the right hand portion of this arm will compress the carbon pile 342. As a result of this first described movement of the rocker arm 339, a greater quantity of current will flow through the control motor 310. On the contrary, the second described movement of the rocker arm 339, after the rocker arm has passed the central or neutral position, will change the direction of rotation of the motor 310, and further downward movement will increase its speed. Thus it will be understood that as the film contacting roller 318 moves inwardly toward the core of the carrier 11', the arm 327 will be operated to increase the speed of revolution of the shaft 301. If at any time the roller 318, due to abnormal conditions of feeding, should move in the opposite direction, the drive for the carrier 11' will be slackened or reversed until the condition is corrected. Forms of film responsive control other than the one above described may be employed if desired.

The connection between the long lever arm 327 and the pivoted control member 308 is to prevent unnecessary movement of the control motor 310 and so-called "hunting." It will be readily understood that as the lever 327 is moved by the cord 325 it will operate the rocker arm 339 through the above described connections since the power of the cord will be wholly insufficient to move the control member 308 against the motor driven screw. As the motor driven screw, however, moves the control plate 308 to its new position, the linkage between the member 308 and the rocker arm 339 will in turn be effective for moving the rocker arm to neutral position obviously without affecting the long lever 327, neutral position being the one in which the link 332 and the long lever 327 are in line. At this point, the control motor 310 will be inoperative. As a practical matter, under normal conditions of feeding, the movement of the cord 325, and consequently of the entire train of elements controlled thereby, will be relatively slow and continuous and the control motor 310 will operate almost continuously and in one direction. The gear reduction between the control motor and the screw and the pitch of the screw are preferably such that the screw moves very slowly. That is to say, we prefer a slow motor movement and a very fine thread upon the screw.

As is clearly shown in Figure 22, under certain conditions it is desirable to control the drive in a different manner and one which is more immediately responsive to the conditions of film operation. The device shown in Figure 22 also accomplishes two other functions which will later be described. As the film f is advanced between the delivery carrier and the continuous delivery sprocket it may pass over axially fixed rollers 351 and 352. A roller 353 may be mounted upon a lever 354 so that it forms a bight in the film between the rollers 351 and 352. This arm may be pivoted at 355 and a long control lever 357 extend therefrom and have attached thereto a cord 325', which is the exact equivalent in its operation of the previously described cord 325. That is to say, the movement of the cord 325' in one direction, influenced by the above described lever system under control of the film, will be effective to change the speed of the control motor 310 and hence of the carrier, and the movement of the cord in the opposite direction through the lever system under the influence of the film will be effective to stop or reverse the movement of the control motor and hence maintain the speed at which the delivery carrier is driven at this point or slacken it if necessary.

Figures 22 and 23 likewise show means which we may employ to accomplish two additional results. The control mechanism previously described herein has been found extremely sensitive and accurate, but obviously if a machine has become worn or it is not properly operated, there may be slight inequalities in the movement of the control mechanism and hence of the film. For that reason it is desirable to add to the control device an element of safety so that if the drive is not immediately responsive the film will not be broken. This result is very simply obtained by the mechanism shown in Figures 22 and 23. The bight of the film between the rollers 351 and 352 is sufficient to allow for a considerable variation in the speed of the drive so that a dangerous stress in the film will not occur instantly. Even though we do not make use of such a supported bight for control purposes we prefer to introduce it as a measure of safety.

As is likewise shown in Figure 23, we prefer to go a step further, although the safety device may be used as it has been previously described. In circuit with the main operating motor M and the light source 114 we may place a snap switch 361 which includes an actuating member 362 so extending as to be in line with adjustable pins 363 mounted in arms 364 and 365 respectively which extend from the lever 354' which is pivoted as upon a point 355'. This lever and its associated parts may be constructed as previously described in connection with the structure shown in Figure 22, and in the drawings corresponding reference numerals with a prime character have been used in the interests of simplicity. It will be readily understood from the drawings that movement of the roller 353' to the positions 367 or 368 shown in dot and dash line in Figure 23 will be effective for operating the switch 361 to circuit breaking position and hence stopping the operation of the entire apparatus. This mechanism is preferably so adjusted that the movement of the arm to the positions shown as 368 will be effective for stopping operation of the machine before the film is broken. If, however, the film should break, or if the regular operation of the toothed feeding members should be interrupted, the spring 358' will be effective quickly to move the roller 353' to the position shown as 367 thus stopping all operations before harm could result.

The operation of the take-up mechanism may be exactly the same as the operation of the delivery mechanism previously described. Reference characters similar to those applied to the delivery carrier of Figure 11 with a prime character added are applied to the take-up mechanism.

As is readily apparent in Figure 11 of the drawings, the driving motors 314 and 314' for the delivery carrier and take-up carrier respectively may be operated by cables which may be attached to or detached from the source of supply either in the operating gear box 371 for the main drive of the apparatus or may be appropriately attached as described in our parent patent to the loading table therein described. The main driving motor M as shown drives a projecting and sound head generally indicated as 12' through connective mechanism generally indicated as 373 in Figure 11. No system of clutches as previously described is necessary.

It is of course to be understood that upon the reversal of the direction of film movement, the toothed feeding members and other film engaging elements and the light sources and light responsive cell will be operated as previously described in connection with Figure 3, through the operation of solenoids 115'' and 116''. These solenoids may be constructed and controlled in any desired way as previously described in connection with solenoids 115 and 116. At this time, it is of course necessary to reverse the direction of the motors 314 and 314'.

Means for reversing these motors are shown in Figure 28. A reversing switch 381 for the two motors is operated through linkage generally shown as 382 by a control shaft 112'', corresponding to shaft 112, which in turn is operated through linkage 383 by the solenoids 115'' and 116''. See Figure 11. Link 113'' controls the operation of the damping means and the various other elements in the projecting and sound heads as previously stated.

Under certain conditions it is desirable to control the speed of the two carriers directly by means of rheostats and to control the rheostats in turn by an operative interconnection with the means which render the damping means operative and inoperative. In view of the great reduction in speed between the driving motors for the individual carriers and the carriers, the amount of power wasted by this method is little, and the operation is sufficiently sensitive. Figure 14 shows this examplification of our invention.

A driving motor M' through a worm 401 and a worm wheel 402 may drive a control shaft 403. The motor M' through the connecting gears 405 may drive the shaft 406 which corresponds to the connective mechanism shown generally as 373 in Figure 11 and the shaft 240 of Figure 2.

The control shaft 403 through a worm 408, worm wheel 409, pinion 410, and gear 411 drives a shaft 412 which supports cams 415 and 416 which correspond to the cams previously described. A cam follower 418 is mounted on a short lever 419 to which is attached or with which there is integrally formed a long lever 420. To maintain the cam follower in relation to the surfaces of the cam, a lever arm 421 extends from a pivot point 422 and is moved downwardly as viewed in Figure 14 as by a spring 423. The upper portion of the arm 420 as viewed in the drawings is formed as or supports a wiper element which cooperates with a rheostat 425. The wiper arm and rheostat are respectively attached to leads of a circuit 426 which controls the motor 427 which through suitable and conventional gear reduction drives the delivery carrier. It will, therefore, be understood that the revolution of the cam 416, which is in direct relation to the feeding of the film through the apparatus, will be effective for controlling the speed of operation of the delivery carrier so that the lineal speed of the film will always be uniform, as at 90 feet per minute.

Similar control mechanism may be provided in connection with the cam 415 which controls the take-up carrier. A cam follower 428 may be attached to a short arm 429 of a lever structure which includes a long arm 430 and a short extension 431 from the pivot point 432, spring 433 being operative to maintain the follower in contact with the cam surface. Formed in or supported by the long lever 430 is a wiper arm which cooperates with a rheostat 435. A circuit 436 operates a motor 437 which drives the take-up carrier in accordance with the amount of current delivered thereto from the rheostat which in turn, as has been previously described, is operated in accordance with the feed of the film through the projecting and sound heads of the apparatus.

Motors 427 and 437 are reversed, in the manner previously described in connection with motor 314 and 314'. The operable elements of the sound and projection heads may be similarly controlled.

As previously stated, we do not limit ourselves to any particular means for timing the intervals between the projecting and rewinding cycles.

Under certain conditions, however, it may be desirable to utilize a novel timing device which is definitely articulated with the control mechanism which determines the speed at which the two carriers are driven and with that which renders the damping means successively operative and inoperative. Such mechanism is shown in Figures 19, 20 and 21.

Two control cams 461 and 462, of the type previously described, may be mounted for revolution with a shaft 463 as by clamps 465 which correspond to the clamp 291 of Figures 15 and 16. Follower cams, which control the speed of movement of both carriers as previously described, may be employed. The movement of the cam 461 may be utilized to open and close a circuit 467 (Figure 21) to a solenoid 115' which corresponds to the solenoid 115 of Figure 5 and the other figures. A similar circuit 489 may be used to control solenoid 116' by means of the movement of the cam 462.

Cam followers, corresponding to cam followers 418 and 428 and 161 and 174, previously described, are omitted from Figures 19 and 20 for clarity. Mounted to be positioned adjacent the high point of the cam 461 is a structure combining a contact finger 468 and a cam surface 469. The contact-making finger 468 may engage a contact 470 set in a depression formed in a fibre block 471 which is mounted upon an arm 472 which is hingedly connected to a collar 473 which encircles a hub 475. Tightening screws 474 may be employed to bind the collar against the hub. This hub is supported as upon a bearing mounted upon a fixed bracket 476.

In order to make it easy for the operator to reestablish the timing between the arm 472 and the cam 461 in the resetting of the cam, a pin 477 extends from a leaf spring 478 which is mounted upon the arm 472 and extends through a suitable opening in that arm toward the cam 461. In resetting the cam, the operator will loosen the clamp 465 and the screws 474 and pinch the leaf spring 478 and the cam 461 together, thus forcing the end of the pin 477 into a detent socket 479 therefor formed in the cam. Thereupon, he can rotate the two together. After he has tightened the respective clamps, he releases the spring which thereupon removes the pin from the detent socket, and relative movement between the cam and the arm 472 will again be possible.

A similar construction may be employed for the cam 462. An arm 481 may be hingedly mounted upon a collar 482 and carry a leaf spring 483 with its appropriate pin, the cam being supplied with a contact point 484 and a camming surface 485 and the arm 481 being supplied with a contact socket 486 into which the contact point 484 fits. The contact point 484 and the contact socket 486 through the circuit 489 control the solenoid 116'.

That conflict between the contact point of the cam and the contact arm may not result on the reverse movement of each of the cams, the combined contacting and cam structures formed upon the cams 461 and 462 are provided with cam or sloping surfaces 469 and 485 so that upon the reverse movement of each cam the contact arm is cammed out of the plane of the cam so that there is no conflict. This operation is clearly seen in Figure 19 in which arm 481 is shown sliding under the cam 462. The springs 480 and 487 will be effective to return the arms 472 and 481 to operative position.

As will be readily understood from the foregoing description, as the operating cam 461 moves to the position shown in the drawings it will make contact and close the circuit 467 thereupon operating the solenoid 115' so that it will be effective to change the parts from the rewinding to the projecting positions. At the conclusion of the reverse movement, the operating cam 462 will cooperate with the contact arm 481 to operate solenoid 116' through the circuit 489, thereby changing the parts from projecting to rewinding position.

As previously stated, the damping means already described as illustrative represents merely one of the preferred forms the control of which has been set out above. Another preferred form is shown in Figures 17 and 18 upon sheet 7 and Figure 27 upon sheet 2. The sound gate illustrated in Figure 17 may include a fixed section 82' and a movable section 83' corresponding to and being controlled as are the gate sections 82 and 83, as shown in Figures 3 and 4. From the aperture here formed the film *f* may extend downwardly as viewed in Figure 17 and around and about a roller 501 mounted loosely as upon a shaft 502, with a collar to limit movement to the right as shown in Figure 18 or such damping means may be placed upon the opposite side of the point of translation. The film may thereupon be led over rollers 503 and into a throat 109' of a take up carrier. In order to serve as a "ripple killing" device, that is to say, to give absolute uniformity to the movement of this film as it passes the sound aperture, a large and relatively heavy fly wheel 504 may be employed. A roller 505, mounted as upon the end of a pivoted arm 506, which is urged toward the film and the roller 501 by a spring 507, may hold the film against the roller. Such a device, if the fly wheel 504 were rigidly connected to and revoluble with the film engaging roller 501, would be known in the art. In order to remove the damping effect of the fly wheel as during the rewinding operation, to render threading more easy, and for other purposes, we supply means for clutching and declutching the fly wheel and film engaging roller.

Mounted upon the shaft 502 we supply a clutch collar 508 with pins 509 extending through appropriate openings in the fly wheel 504 and engageable with suitable openings in the film engaging member 501. A yoke 511, as is best seen in Figure 27, through pins which engage with a slot 513, is effective to move the clutch collar along the axis of the shaft 502. As will be readily apparent, such movement to the right as viewed in Figure 18 will be effective for operatively joining the fly wheel and the film engaging member while movement to the left will disengage the two. The yoke 511 may be mounted upon a shaft 514 which is appropriately mounted upon the apparatus. To move the yoke, a pin 515 is fixed thereto and operates in a cam slot 516 which is cut in the control member 107' of Figure 27 which otherwise exactly corresponds to and is operated as the control member 107 of Figures 3 and 4. It will thus be seen that the movement of the control member 107 of Figure 3 or 107' by the control member 58 which is operated by the solenoids 115 and 116 will be effective to render the damping means effective and ineffective in timed or sequential relation to the starting and stopping of all the other operable elements of the entire apparatus.

At many points in this description for purposes of illustration we mention the controlling element of one modification of our invention as cooperating with the controlled element of a specified modification thereof. For example, in the immediately foregoing portion of this description we state that the control member 58 may be operated by the solenoids 115 and 116. It will be readily understood, however, that such control member may be equally well operated as by the solenoids 115' and 116' or by the electrical or mechanical timing devices of the previously mentioned Proctor or Foster patents or otherwise. We wish it definitely understood, that we in no way are limiting ourselves to any specific combination or combinations between the corresponding elements of the various modifications or species of our invention.

It is believed that the operation of all parts and phases of the invention will be clear from the foregoing description, but a short résumé of certain aspects of it may be useful.

Prior to the loading operation or unloading operation, to which reference has been made above, it is of course necessary in any exemplification of our invention including mechanism by means of which either of such operations can be carried out to render the delivery carrier and the head inoperative both to save wear and avoid interference with the timing. In purely mechanical forms of our invention this result is obtained by the downward movement of the control handle 264 in Figure 7 which declutches the delivery operating shaft 144 and the head operating shaft 240 and simultaneously operates the clutches 189—190 and 205—206, best shown in Figures 9 and 10, to render the high speed take-up drive operative and the low speed take-up drive inoperative. Simultaneously the rewind drive, if it should happen to be in operative position, will be declutched. By use of handle 295, the parts may be set as desired. It will be understood that at this point in the cycle of operations the film previously upon the delivery carrier will have been completely fed to the take-up carrier and consequently the cam follower 161 will be in the zeno or empty-reel relation to the cam 162 which controls the delivery carrier. It will be understood that the downward movement of the handle 264, previously described, will have been effective for declutching the delivery cam and its follower from the driving shaft.

In the following unloading operation the cam follower 174 for the cam 175 will move back to the zero or empty-reel position. During this unloading operation the cam and follower for the delivery carrier remain in the zero position. In the subsequent loading operation the cam and follower for the take-up reel move to the proper position as indicated for the end of the particular film which is being wound upon the take-up carrier. If, for example, the program consists of 18,000 feet, as in a fully developed theatrical apparatus, the cam for the take-up carrier will be at the position for such footage when the film is completely wound upon the take-up carrier. During this winding up or loading operation the cam and follower for the delivery carrier will have remained in the zero position.

In case any form of the invention shown in Figure 11 or 14 is employed for such a loading or unloading operation, the take up carrier unit is operatively separated from the rest of the machine by changing the lead of the motor 314' or 437 respectively from the body of the apparatus to a loading machine, as described in our parent patent, or attaching it to any outlet. It will be understood that such break occurs after the film is all upon the take-up reel so that the delivery carrier cam will be at the zero or empty carrier position in case the form shown in Figure 14 is used.

After the take-up carrier has been loaded, it is necessary to rewind the film into the delivery magazine. The operator through the use of handle 264, will reset the mechanism, if it is of the Figure 7 type. If of the other types, he will merely re-attach the leads to the projector.

By use of the handle 295 he will place the apparatus in rewinding position, so far as the clutches are concerned, but will not start the motor or motors until he has fastened the trailing end of the film to the delivery carrier. At that point he will re-start the machine and the rewinding operation will be automatically carried out. At the conclusion of the rewinding operation, as, for example, by the signaling means shown in Figure 5, the rewinding operation will be concluded and the projecting operation re-started. At this point of change of cycles the cam and follower for the take-up carrier will have gone back again to the zero position and the cam and follower for the delivery carrier will have reached their maximum position. It will therefore be understood that if the cycle of operation is carried out as we prefer, no hand-setting of the cams will be necessary.

In the forms of our invention in which the film itself determines the speed of the two carriers no question of adjustment arises.

Throughout this description the invention has been described as applied to a projecting apparatus. It will be readily understood, however, that in such cases as it is desired to expose or to print a large amount of film, the invention is equally applicable. The invention also has many other uses. Various of the advantages of our invention will be evident from the foregoing description, the attached drawings and the subjoined claims.

Other advantages are those which arise from mechanism for controlling, preferably automatically, the operation of damping means for a film preferably in predetermined correlation with all of the other operable parts of the apparatus or with any or a portion thereof, said film bearing thereupon symbols representing sound and also but not necessarily pictures. Still other advantages are those which arise from the provision of a machine for presenting an entire evening's motion picture program as a unit with an increase in the safety of the public, a decrease in time and skill required in operation, and better results to the eye and to the ear of a member of the audience.

We claim:

1. In an apparatus for handling a sound film, a sound head, means for moving a film past said sound head, operable damping means for imparting regularity of movement to the film as it is moved past said sound head, control mechanism for rendering said damping means selectively and alternatively effective upon the film as it is fed past said sound head and ineffective thereupon while it is being so fed, and actuating means operated by the film as it is fed past said sound head for operating said control mechanism.

2. In an apparatus for handling a sound film, a sound head, means for advancing the film past said sound head, operable damping means for imparting regularity of movement to the film as it is advanced past said sound head, control mechanism for selectively rendering said damping means alternatively effective upon the film as it is advanced past said sound head and ineffective thereupon while it is so fed, and an actuating member for said control mechanism operated by a predetermined portion of the film as it is so fed.

3. In an apparatus for handling a sound film and having a plurality of power-operated means, a sound head past which a film may be advanced, means for advancing the film past said sound head, mechanism for driving said film-advancing means and said other operable parts of said apparatus, operable damping means for imparting regularity of movement to the film as it is advanced past said sound head, control mechanism for rendering said damping means alternatively effective upon the film as it is advanced past said sound head and ineffective thereupon during the continued powered operation of power-operated means of said apparatus, and an actuating member operated by the moving film for operating said control mechanism.

4. In an apparatus for handling a sound film, a sound station, means for feeding a film past said sound station at a predetermined speed suitable for the reproduction or recordation of sound, damping mechanism for the film, said damping mechanism comprising a film-engaging roller, a structure of relatively heavy mass, and positive means for connecting and disconnecting said structure from said film-engaging roller so that said roller may subject the film to the damping influence of said mass while said structure is connected with said roller and so the film may be free therefrom while said structure is not so connected, said feeding means being effective for advancing the film while in engagement with said roller while said roller is connected to said mass and also while said roller is disconnected therefrom and said control means embodying instrumentalities effective for maintaining said roller and said structure disconnected while the film is being fed at said predetermined speed.

5. In an apparatus for handling a sound film, a sound station, means for feeding a film past said sound station, damping mechanism for the film, said damping mechanism comprising a film-engaging roller, a structure of relatively heavy mass, and a clutch for selectively connecting and disconnecting said structure from said film-engaging roller so that said roller can subject the film to the damping influence of said mass while said structure is connected with said mass and so that the film may be free therefrom while said structure is not so connected, said clutch comprising a driving and a driven member one of which is connected to said roller and the other one of which is connected to said structure, an actuating member operatively connected to one of said members and movable between a first position wherein it places said driving and driven members in motion-transmitting relation to each other and a second position wherein it removes said members from such relation, and means for moving said member between said positions, said feeding means including means for advancing the film while it is in engagement with said roller while said roller is clutched to said mass and also while said roller is declutched therefrom.

6. In an apparatus for handling a sound film, guiding means establishing a path for a film, a sound station disposed along said path, means for feeding the film past said sound station, and damping mechanism for the film, said damping mechanism comprising two spaced film-engaging rollers between which the film extends, a mounting for said rollers movable to a first position wherein said rollers are disposed in angular relation to said path and the film by such movement is displaced from said path and thereby subjected to damping influence and to a second position wherein said rollers are disposed in parallel relation to said path and the film is merely guided in relation thereto and not subjected to damping influence, and means for moving said mounting between said positions.

7. In an apparatus for handling a sound film, a sound head, means for feeding a film past said sound head, operable damping means for imparting regularity of movement to the film as it is fed past said sound head, said damping means including a member movable between a first position wherein it renders said damping means effective upon the film and a second position wherein it renders said damping means ineffective upon the film, mechanism for moving said member from one of said positions to the other thereof, a signal borne by the film, and actuating means operated by said signal as the film moves past said sound head for operating said moving means.

8. In an apparatus for handling a sound film and having a sound station and means for feeding a film past said sound station; operable damping means for imparting regularity to the movement of the film as it is fed past said sound station, control mechanism for rendering said damping means inoperative upon the film, said control mechanism including an actuating member which when moved to a predetermined position selectively operates said mechanism, and means for moving the film past said sound station while said damping means is inoperative upon the film following the operation of said actuating member.

9. In an apparatus for handling a sound film, a sound station, means for moving a film past said sound station, control means for starting the operation of said moving means, damping means for imparting regularity to the movement of the film as it is moved past said sound station, control means for rendering said damping means operative upon the film, and mechanism operatively interconnecting said two control means and including instrumentalities alternatively effective for operating each of said control means simultaneously and for operating one of said control means while maintaining the other thereof inoperative.

10. In an apparatus for handling a sound film, a picture station, means for intermittently feeding a film past said picture station, a source of power, a sound station, means for continuously feeding the film past said sound station, damping means for imparting regularity of movement to the film as it is fed past said sound station, said damping means including a film contacting member and means for rendering said film contacting member ineffective upon the film for modifying its movement preparatory to a film threading operation, means for breaking the connection between said source of power and said intermittent feeding means preparatory to a film threading operation, control means operatively interconnecting said means for breaking said connection and said means for rendering said film contacting member ineffective upon the film for concomitantly operating both of said means, and means for moving the film in said apparatus after said means for rendering said film contacting member ineffective upon the film has been operated.

11. In an apparatus for handling a sound film, a picture station, means for intermittently feeding a film past said picture station, a sound station, means for feeding the film past said sound station, operable damping means for imparting regularity of movement to the film as it is fed past said sound station, said damping means including a film contacting member and actuating means for rendering said film contacting member effective upon the film for modifying its movement, a source of power, means separate from said actuating means for applying power from said source to said intermittent feeding means, and control means operatively interconnecting said power applying means and said means for rendering said film contacting member effective upon the film for concomitantly operating both thereof.

12. In an apparatus for handling a sound film, guiding means establishing a path for a film, a picture station and a sound station respectively disposed along said path, means for feeding said film past said stations, means for controlling the operation of said feeding means, damping mechanism for said film, said damping mechanism comprising two spaced film-engaging rollers between which the film extends, a mounting for said rollers movable between a first position wherein said rollers are disposed in angular relation to said path and thereby subject the film to damping influence and to a second position wherein said rollers are disposed in parallel relation to said path for merely guiding the film in relation thereto without subjecting it to damping influence, and means for moving said mounting between said positions, and control means operatively interconnecting said controlling means and said moving means for concomitantly operating each of said means.

13. In an apparatus for handling a sound film, guiding means establishing a path for the film, a picture station and a sound station respectively disposed along said path, means for feeding the film past said stations, means for starting the operation of said feeding means, damping mechanism for the film, said damping mechanism comprising two spaced film-engaging rollers between which the film extends, a mounting for said rollers movable between a first position wherein said rollers are disposed in angular relation to said path for subjecting the film to damping influence and to a second position wherein said rollers are disposed in parallel relation to said path for merely guiding the film in relation thereto without subjecting it to damping influence, and means for moving said mounting from said second position to said first position, and control means operatively interconnecting said means for starting said feeding means and said moving means of said damping mechanism and including instrumentalities for concomitantly operating each of said means whereby the film is subjected to the damping effect of said rollers concomitantly with the starting of a feeding movement thereof.

14. In an apparatus for handling a sound film, guiding means establishing a path for the film, a picture station and a sound station respectively disposed along said path, means for feeding the film past said stations, means for stopping the operation of said feeding means, damping mechanism for the film, said damping mechanism comprising two spaced film-engaging rollers between which the film extends, a mounting for said rollers movable between a first position wherein said rollers are disposed in angular relation to said path for subjecting the film to damping influence and to a second position wherein said rollers are disposed in parallel relation to said path for merely guiding the film in relation to said path without subjecting it to damping influence, and means for moving said mounting from said first position to said second position, and control means operatively interconnecting said means for stopping said feeding means and said moving means and including instrumentalities for concomitantly operating each of said means whereby the film is removed from the damping effect of said rollers concomitantly with the stopping of the feeding movement thereof.

15. In an apparatus for handling a sound film, a sound station including an aperture, a sprocket for feeding a film past said aperture, operable damping means for imparting regularity of movement to the film as it is so fed, means for rendering said damping means effective upon the film, operable and separate means for pressing the film into operative relation to said sprocket, means for selectively rendering said pressing means operative upon the film, and control mechanism operatively interconnecting said means for rendering said damping means effective upon the film and said means for operating said pressing means and including instrumentalities for concomitantly operating both thereof.

16. In an apparatus for handling a film having thereon symbols representing sound, a sound head, means for feeding a film bearing such symbols past said sound head, a film contacting member which establishes a focal plane of said sound head, means for translating sound from said symbols as the film is fed along said focal plane, a member movable to a position wherein it initially positions the film in said focal plane, means for moving said member in relation to said position, operable damping means separate from said positioning member for imparting regularity of movement to the film as it passes along said plane at which said symbols are translated, control mechanism for rendering said damping means initially effective upon the film, and actuating mechanism operatively interconnecting said control mechanism and said moving means and including instrumentalities for concomitantly operating each thereof.

17. In an apparatus for handling a film having upon it symbols representing sound, an apertured film contacting member which establishes a focal plane, means for feeding the film along said focal plane, means for translating sound from said symbols as the film is fed along said focal plane, a member movable to a position wherein it initially positions the film in said focal plane, a mount upon which said member is movable, damping means movable to a position wherein it imparts regularity of movement to the film as it passes along said plane, an operating connection between said mount and said damping means for moving said damping means into operative position upon the movement of said mount, and means for moving said mount.

18. In an apparatus for handling a film having thereon symbols representing sound, a film contacting member for establishing a focal plane, means for translating sound from said symbols as the film is moved along said focal plane, a member movable between a first position wherein it initially establishes and thereafter maintains the film in said focal plane and a second position relatively distant from said plane, means for moving the film along said focal plane while said member maintains the film in said focal plane, electro-magnetic means including a circuit for moving said member from one of said positions to the other thereof, and a signal carried by the film for closing said circuit as the film is moved along said plane.

19. In an apparatus for handling a sound film, two carriers between which a film extends, means establishing a path of travel for the film therebetween, a sound station disposed along said path, means for moving a film along said path and past said sound station in a projecting direction, operable damping means for imparting regularity to the movement of the film as it is so fed along said path and past said sound station, means for moving the film along said path and past said sound station in a contrary or rewinding direction, and means for rendering said damping means ineffective upon the film as it is moved along said path and past said sound station in said rewinding direction whereby said rewinding operation may be carried out rapidly without interference by said damping means.

20. In a film handling apparatus having a sound station, mechanism for moving a film past said sound station in a projecting direction, mechanism for moving the film past said sound station in a rewinding direction, damping means for imparting regularity to the movement of the film past said sound station, means for rendering said damping means effective and ineffective upon the film, means for rendering said moving mechanisms alternatively effective, and control mechanism operatively interconnecting said means for rendering said damping means effective and ineffective upon the film and said means for rendering said moving mechanisms alternatively effective for concomitantly operating both thereof.

21. In an apparatus for handling a sound film, a sound head, means for feeding a film past said sound head in a projecting direction, means for feeding a film past said sound head in a rewinding direction, operable damping means for imparting regularity of movement to the film as it is fed past said sound head in a projecting direction, control mechanism for rendering said damping means ineffective upon the film while it is being rewound, and actuating mechanism for said control mechanism necessarily operative at the conclusion of such projecting operation for operating said control mechanism for rendering said damping means ineffective upon the film in preparation for a subsequent rewinding operation.

22. In an apparatus for handling a sound film, a delivery carrier and a take-up carrier between which a film extends, a sound head, means for feeding a film past said sound head in a projecting direction, means for feeding a film past said sound head in a rewinding direction, operable damping means for imparting regularity of movement to the film as it is fed past said sound head in a projecting direction, control mechanism for rendering said damping means ineffective upon the film while it is being rewound from said take-up carrier toward said delivery carrier, a signal borne by the trailing end of the film, and actuating mechanism operated by said signal at the conclusion of the projecting operation for operating said control mechanism for rendering said damping means ineffective upon the film in preparation for a subsequent rewinding operation.

23. In an apparatus for handling a sound film, a sound head, means for feeding a film past said sound head in a projecting direction, means for feeding a film past said sound head in a rewinding direction, operable damping means for imparting regularity of movement to the film as it is fed past said sound head in a projecting direction, and control mechanism for rendering said damping means alternatively ineffective and effective upon the film, said control mechanism including means for rendering said damping means ineffective upon the film while it is being rewound, means for rendering said damping means effective upon the film while it is being fed, and actuating mechanism for said means for rendering said damping means effective upon the film necessarily operative at the conclusion of a rewinding operation for rendering said damping means effective upon the film preparatory to a subsequent projecting operation.

24. In an apparatus for handling a sound film, a sound head, means for feeding a film past said sound head in a projecting direction, means for feeding a film past said sound head in a rewinding direction, operable damping means for imparting regularity of movement to the film as it is fed past said sound head in a projecting direction, and control mechanism for rendering said damping means ineffective and effective upon the film, said control mechanism including means for rendering said damping means ineffective upon the film while it is being rewound, means for rendering said damping means effective upon the film while it is being fed, a signal carried by the leading end of the film, said end during a rewinding operation becoming the trailing end, and actuating mechanism operated by said signal at the conclusion of a rewinding operation for operating said means for rendering said damping means effective upon the film in preparation for a subsequent projecting operation.

25. In an apparatus for handling a sound film, a delivery carrier and a take-up carrier, a picture station and a sound station disposed between said carriers, guides establishing a channel between said carriers wherein a film initially may be threaded and through which it thereafter may be fed, toothed means normally projecting within said channel for feeding the film in relation to said picture station, means for clearing said channel of the teeth of said feeding means so that a film may be readily threaded therein, means for feeding the film past said sound head, damping means including a member engageable with the film within said channel for imparting regularity of movement to the film as it passes said sound head, control mechanism for rendering said damping means ineffective upon the film thereby facilitating a threading operation, and actuating means operatively interconnecting said control mechanism and said means for clearing said channel for concomitantly operating both thereof.

26. In an apparatus for handling a sound film, a delivery carrier and a take-up carrier, a sound station disposed between said carriers, guides establishing a channel for directing a film between said carriers and past said sound station, toothed feeding means disposed between said carriers for advancing the film from said delivery carrier toward said take-up carrier along said channel and feeding it past said sound station, operable damping means for imparting regularity to the movement of the film as it is fed past said sound station, means for rendering said channel clear of interference by said toothed feeding means, means for applying power to said delivery carrier for revolving it in a rewinding direction for drawing the film from said take-up carrier back to said delivery carrier through said channel after it has been cleared, means for rendering said damping means inoperative upon the film as it is rewound through said cleared channel from said take-up carrier to said delivery carrier, and control mechanism operatively interconnecting said means for applying power to said delivery carrier and said means for rendering said damping means inoperative upon the film for concomitantly operating both thereof.

27. In an apparatus for handling a sound film, a delivery carrier and a take-up carrier between which a film extends, a sound station disposed therebetween, means for feeding a film past said sound station, operable damping means for imparting regularity of movement to the film as it is fed past said sound station, means for driving said delivery carrier for rewinding the film from said take-up carrier thereupon after a feeding operation, timing means governing said driving means for constantly changing the speed of revolution of said delivery carrier during said rewinding operation so that the lineal speed of the film remains substantially constant, means for rendering said damping means ineffective upon the film during said rewinding operation, control means for rendering said damping means effective upon the film preparatory to a subsequent feeding operation, and means actuated by said timing means at the conclusion of said rewinding operation for operating said control means thereby rendering said damping means effective upon the film.

28. In an apparatus for handling a sound film, a delivery carrier and a take-up carrier between which a film extends, a sound station disposed therebetween, means for feeding the film past said sound station from said delivery toward said take-up carrier, operable damping means for imparting regularity of movement to the film as it is fed past said sound station, means for driving said delivery carrier for rewinding the film from said take-up carrier thereupon after a feeding operation, timing means including a cam for governing said driving means for constantly changing the speed of revolution of said delivery carrier during said rewinding operation so that the lineal speed of the film remains substantially constant, means for rendering said damping means ineffective upon the film during said rewinding operation so that said operation is carried out without interference from said damping means, control mechanism for rendering said damping means effective upon the film preparatory to a subsequent feeding operation, and a connection between said cam of said timing means and said control mechanism for operating said control mechanism at the conclusion of said rewinding operation so that said damping means is again rendered effective upon the film.

29. In an apparatus for handling a sound film, a delivery carrier and a take-up carrier between which a film extends, a sound station disposed therebetween, means for feeding the film past such sound station from said delivery carrier toward said take-up carrier, operable damping means for imparting regularity of movement to the film as it is fed past said sound station, means for rendering said damping means effective upon the film during a feeding operation, means for driving said delivery carrier in a rewinding direction for rewinding the film thereupon after a feeding operation, timing means governing said driving means for constantly changing the speed of revolution of said delivery carrier during said rewinding operation so that the lineal speed of the film remains substantially constant, means for rendering said damping means ineffective upon the film preparatory to said rewinding operation, and control mechanism operatively interconnecting said timing means and said means for rendering said damping means ineffective upon the film for concomitantly starting the operation of said timing means and rendering said damping means ineffective upon the film.

30. In an apparatus for handling a sound film, a delivery carrier and a take-up carrier between which a film extends, a sound station disposed therebetween, means for feeding the film past said sound station from said delivery toward said take-up carrier, operable damping means for imparting regularity of movement to the film as it is fed past said sound station, means for driving said take-up carrier in a feeding direction, positive timing means governing said driving means for constantly changing the speed of revolution of said take-up carrier during said feeding operation so that the lineal speed of the film remains substantially constant, control means for rendering said damping means ineffective upon the film, and means actuated by said timing means at the conclusion of said feeding operation for operating said control means thereby rendering said damping means ineffective upon the film.

31. In an apparatus for handling a sound film, a delivery carrier and a take-up carrier between which a film extends, a sound station disposed therebetween, means for feeding the film past said sound station from said delivery carrier toward said take-up carrier, operable damping means for imparting regularity of movement to the film as it is fed past said sound station, means for driving said take-up carrier in a feeding direction, timing means governing said driving means for constantly changing the speed of revolution of said take-up carrier during said feeding operation so that the lineal speed of the film remains substantially constant, means for rendering said damping means effective upon the film preparatory to said feeding operation, and control mechanism operatively interconnecting said timing means and said means for rendering said damping means effective upon the film for concomitantly starting the operation of said timing means and rendering said damping means effective upon the film.

32. In an apparatus for handling a sound film, two carriers between which a film extends, a sound station disposed therebetween, means for feeding the film past said sound station, operable damping means for imparting regularity of movement to the film as it is fed past said sound station, control mechanism for moving said damping means between a first position in which it is operative upon the film and a second position in which it is inoperative upon the film, means for driving at least one of said carriers, timing means governing said driving means for constantly changing the speed of revolution of said driven carrier so that the lineal speed of the film wound thereupon remains substantially constant, and an actuating connection between said timing means and said control mechanism for concomitantly actuating one thereof by the other thereof.

33. In an apparatus for handling a sound film, two carriers between which a film extends, a sound station disposed therebetween, means for feeding the film past said sound station, operable damping means for imparting regularity of movement to the film as it is fed past said sound station, electro-magnetic control mechanism including a circuit for rendering said damping means operable upon the film, means for driving at least one of said carriers, and timing means, said timing means including instrumentalities for governing said driving means for constantly changing the speed of revolution of said carrier so that the lineal speed of the film being wound thereupon remains substantially constant and for closing said circuit in predetermined relation to said winding operation.

34. In an apparatus for handling a film bearing thereupon symbols representing sound, a delivery carrier and a take-up carrier between which a film is moved, a picture station and a sound station disposed between said carriers, each of said stations including a fixed member establishing a focal plane and a member movable between a first position relatively distant from said fixed member associated therewith and a second position relatively adjacent thereto, the movement of said members between said positions being effective for moving the film into said focal planes respectively, means for moving said members between said positions, a source for passing light through the film at said picture station, means for translating sound from said symbols as the film passes along the focal plane of said sound station, guides including said movable members for establishing a channel for directing a film between said carriers and past said stations, feeding means disposed between said carriers for advancing the film from said delivery carrier along said channel toward said take-up carrier, said feeding means including a toothed pull-down member for intermittently advancing the film past said picture station and continuously revolving toothed sprockets for maintaining loops of slack film associated with said intermittent member and for advancing the film past said sound station, a source of power, means for connecting and disconnecting said sprockets and said intermittent pull-down respectively and said source of power, operable damping means for imparting regularity to the movement of the film as it is fed past said sound station, control mechanism for rendering said damping means alternatively operable and inoperable upon the film, means for rendering said channel clear of interference by teeth of said feeding means, a first means for driving said take-up carrier in a feeding direction, a first means for alternatively connecting and disconnecting said first driving means and said source of power, a first timing means for positively governing said first driving means so that the speed of revolution of said carrier continuously changes at such rate that the lineal speed of the film being wound up thereupon remains constant, a second means for driving said delivery carrier in a rewinding direction for rewinding the film thereupon, a second means for alternatively connecting and disconnecting said driving means from said source of power, and a second timing means for governing said driving means so that the revolution of said delivery carrier constantly changes so that the lineal speed of the film being rewound thereupon remains constant.

35. In an apparatus for handling a film having thereupon symbols representing sound, a delivery carrier and a take-up carrier between which a film is moved, a picture station and a sound station disposed between said carriers, each of said stations including a fixed member establishing a focal plane and a member movable between a first position relatively distant from said fixed member associated therewith and a second position relatively adjacent thereto, the movement of said members between said positions being effective for moving the film into said focal planes respectively, means for moving said members between said positions, a source of light, means for rendering light from said source alternatively effective and ineffective upon the film, mechanism for translating sound from said symbols as the film passes along the focal plane of said sound station, means for rendering said sound translating mechanism alternatively effective and ineffective, guides including said movable members for establishing a channel for directing a film between said carriers and past said stations, toothed feeding members disposed between said carriers for advancing the film from said delivery carrier along said channel toward said take-up carrier, said feeding members including a toothed pull-down member for intermittently advancing the film past said picture station and continuously revolving toothed sprockets for maintaining loops of slack film associated with said intermittent pull-down and for advancing the film past said sound station, a source of power, means for alternatively connecting and disconnecting said sprockets and said intermittent pull-down respectively and said source of power, operable damping mechanism for imparting regularity to the movement of the film as it is fed past said sound station, control means for rendering said damping mechanism alternatively operable and inoperable upon the film, means for rendering said channel clear of interference by said toothed feeding members, a first mechanism for driving said take-up carrier in a feeding direction, a first means for alternatively connecting and disconnecting said first driving mechanism and said source of power, a first timing mechanism for positively governing said first driving mechanism so that the speed of revolution of said carrier continuously changes at such rate that the lineal speed of the film being wound up thereupon remains substantially constant, a first means for starting and stopping the operation of said first timing mechanism, a second mechanism for driving said delivery carrier in a rewinding direction for rewinding the film thereupon, a second means for alternatively connecting and disconnecting said second driving mechanism and said source of power, a second timing mechanism for governing said second driving mechanism so that the rate of revolution of said carrier changes so that the lineal speed of the film being wound thereupon remains substantially constant, a second means for alternatively starting and stopping the operation of said second timing mechanism, and control mechanism operatively interconnecting all of said means and including instrumentalities for concomitantly operating all thereof.

36. In an apparatus for handling a film having thereupon symbols representing sound, a delivery carrier and a take-up carrier between which a film is moved, a picture station and a sound station disposed between said carriers, each of said stations including a fixed member establishing a focal plane and a member movable between a first position relatively distant from said fixed member associated therewith and a second position relatively adjacent thereto, the movement of said members between said positions being effective for moving the film into said focal planes respectively, means for moving said members between said positions, a source of light, means for rendering light from said source alternatively effective and ineffective upon the film, mechanism for translating sound from said symbols as the film passes along the focal plane of said sound station, guides including said movable members for establishing a channel for directing a film between said carriers and past said stations, toothed feeding members disposed between said carriers for advancing the film from said delivery carrier along said channel toward said take-up carrier, said feeding members including a toothed pull-down member for intermittently advancing the film past said picture station and continuously revolving toothed sprockets for maintaining loops of slack film associated with said intermittent pull-down and for advancing the film past said sound station, a source of power, means for alternatively connecting and disconnecting said sprockets and said intermittent pull-down respectively and said source of power, operable damping mechanism for imparting regularity to the movement of the film as it is fed past said sound station, control means for rendering said damping mechanism alternatively operable and inoperable upon the film, means for rendering said channel clear of interference by said toothed feeding members, a first mechanism for driving said take-up carrier in a feeding direction, a first means for alternatively connecting and disconnecting said first driving mechanism and said source of power, a first timing mechanism for positively governing said first driving mechanism so that the speed of revolution of said carrier continuously changes at such rate that the lineal speed of the film being wound up thereupon remains substantially constant, a first means for starting and stopping the operation of said first timing mechanism, a second mechanism for driving said delivery carrier in a rewinding direction for rewinding the film thereupon, a second means for alternatively connecting and disconnecting said second driving mechanism and said source of power, a second timing mechanism for governing said second driving mechanism so that the rate of revolution of said carrier changes so that the lineal speed of the film being wound thereupon remains substantially constant, a second means for starting and stopping the operation of said second timing mechanism, electro-magnetic control mechanism including actuating circuits operatively interconnecting all of said means and including instrumentalities for concomitantly operating all thereof, and signals carried by the moving film for closing said circuits.

WARREN DUNHAM FOSTER.
GERTRUDE SWEET,
*Administratrix of Estate of Frederick Davenport Sweet, Deceased.*